US012583780B1

(12) United States Patent
Contreras

(10) Patent No.: US 12,583,780 B1
(45) Date of Patent: Mar. 24, 2026

(54) SYSTEM USING VENTURI INJECTORS IN SERIES

(71) Applicant: Eco World Water Corp, Fort Lauderdale, FL (US)

(72) Inventor: Santiago Contreras, Pembroke Pines, FL (US)

(73) Assignee: Eco World Water Corp, Fort Lauderdale, FL (US)

( * ) Notice: Subject to any disclaimer, the term of this patent is extended or adjusted under 35 U.S.C. 154(b) by 0 days.

(21) Appl. No.: 19/299,297

(22) Filed: Aug. 13, 2025

(51) Int. Cl.
| | |
|---|---|
| *C02F 9/00* | (2023.01) |
| *B01F 25/312* | (2022.01) |
| *B01F 101/00* | (2022.01) |
| *C02F 1/24* | (2023.01) |
| *C02F 1/38* | (2023.01) |
| *C02F 1/52* | (2023.01) |

(52) U.S. Cl.
CPC .......... *C02F 9/00* (2013.01); *B01F 25/31233* (2022.01); *C02F 1/24* (2013.01); *C02F 1/38* (2013.01); *C02F 1/52* (2013.01); *B01F 2101/305* (2022.01)

(58) Field of Classification Search
None
See application file for complete search history.

(56) References Cited

U.S. PATENT DOCUMENTS

| | | |
|---|---|---|
| 1,777,239 A | 9/1930 | Weir |
| 2,106,043 A | 1/1938 | Urquhart et al. |
| 2,665,975 A | 1/1954 | Ng |
| 3,181,797 A | 5/1965 | Hayes |
| 4,123,800 A | 10/1978 | Mazzei |
| 4,559,146 A | 12/1985 | Roets |
| 5,464,320 A * | 11/1995 | Finney .................... F03D 1/04 |
| | | 415/60 |
| 5,863,128 A | 1/1999 | Mazzei |
| 6,227,460 B1 | 5/2001 | Funk et al. |
| 11,008,227 B2 | 5/2021 | Worley et al. |

(Continued)

FOREIGN PATENT DOCUMENTS

| | | |
|---|---|---|
| CN | 102230625 A | 11/2011 |
| CN | 102434501 A | 5/2012 |

(Continued)

OTHER PUBLICATIONS

How a Mazzei Venturi Injector Works, YouTube Video, MazzeiSolutions, Aug. 19, 2019, accessed from the Internet from https://www.youtube.com/watch?v=Vg_HX-BU85U on May 13, 2025.

(Continued)

*Primary Examiner* — Jonathan M Peo
(74) *Attorney, Agent, or Firm* — Stone Creek Services LLC; Alan M Flum

(57) ABSTRACT

Disclosed is a system that uses multiple Venturi injectors in series. These Venturi injectors may inject a fluid, such as a gas or a liquid, into the liquid stream passing through the Venturi injectors. The system may include two or more Venturi injectors with an inlet port that receives an inlet liquid stream, a suction port that may passively receive a fluid, such as a gas, and an outlet port that ejects the mixture of liquid and fluid. The Venturi injectors are positioned in series along a liquid conduit, where each downstream Venturi injector is successively larger than the immediately preceding Venturi injector.

18 Claims, 14 Drawing Sheets

(56) References Cited

U.S. PATENT DOCUMENTS

| | | |
|---|---|---|
| 11,084,737 B1 | 8/2021 | Contreras et al. |
| 2003/0032826 A1 | 2/2003 | Hanna |
| 2009/0314702 A1 | 12/2009 | Mazzei |
| 2010/0006048 A1* | 1/2010 | Minty .................. B64D 37/34 |
| | | 123/25 A |
| 2021/0032125 A1* | 2/2021 | Worley .................. C02F 1/385 |
| 2023/0405535 A1 | 12/2023 | Williams |

FOREIGN PATENT DOCUMENTS

| | | |
|---|---|---|
| CN | 103210733 B | 4/2015 |
| CN | 103141204 B | 11/2015 |
| CN | 205390237 U | 7/2016 |
| CN | 104941762 B | 3/2017 |
| GB | 191407678 A | 3/1915 |
| GB | 179976 A | 5/1922 |
| GB | 292031 A | 6/1928 |
| KR | 101756970 B1 | 7/2017 |
| WO | 09208533 A1 | 5/1992 |
| WO | WO-2023247381 A1 * | 12/2023 .............. F04F 5/467 |
| WO | 2024006083 A1 | 1/2024 |

OTHER PUBLICATIONS

Mazzei AirJection® Irrigation, YouTube Video, MazzeiSolutions, Feb. 14, 2018, access from the Internet from https://www.youtube.com/watch?v=a8SZ7iewTas on May 13, 2025.

Vacuum ejector, Wikipedia, last edited, Jan. 7, 2025, Wikimedia Foundation, downloaded from the Internet from: https://en.wikipedia.org/w/index.php?title=Vacuum_ejector&oldid=1267859280 on May 13, 2025.

B. D. Power, High Vacuum Pumping Equipment, pp. 147-163, 1966, William Clowes, and Sons, Limited, London.

I B Murmanskii et al., Nov. 2017 J. Phys.: Conf. Ser. 891, downloaded from the Internet from: https://www.researchgate.net/publication/320994210 on May 14, 2025.

Steam Jet Ejectors, Bulletin SE-H, Oct. 2024, Schutte & Koreting, downloaded from the Internet from: https://www.s-k.com/wp-content/uploads/2024/10/Bulletin-5EH-Steam-Jet-Ejectors.pdf on May 14, 2025.

Connected 2 Venturis in Series (need a solution), Physics Forums, Jun. 5, 2024, downloaded from the Internet from: https://www.physicsforums.com/threads/connected-2-venturis-in-series-need-a-solution.1063343/ on May 15, 2025.

Mazzei Venturi Injectors, The Low Cost Solution for Agriculture, Jan. 2020, Mazzei Injector Company, LLC.

Zhu et al., Aerator Module Development Using Venturi Air Injectors to Improve Aeration, Applied Engineering in Agriculture, Sep. 2007, downloaded from the Internet from: https://www.researchgate.net/publication/259264118 on May 15, 2025.

C. Dong et al., Evaluation of six aerator modules built on venturi air injectors using clean water test, Water Sciences & Technology, 60.5, 2009, pp. 1353-1359, IWA Publishing, downloaded from the Internet from: https://www.academia.edu/77899886/ on May 15, 2025.

Gebremedhen, Design and Construction of a Solar Powered System for Fish Farms, Ph.D. Thesis, Graduate School of Natural and Applied Sciences, Department of Agricultural Machinery and Technologies Engineering, May 2016, pp. 27, 57, and 58, Ankara University, Ankara Turkey, downloaded from the Internet from: https://acikbilim.yok.gov.tr/bitstream/handle/20.500.12812/45916/yokAcikBilim_10110656.pdf on May 15, 2025.

Sayyaadi, Assessment of Tandem Venturi on Enhancement of Cavitational Chemical Reaction, Journal of Fluids Engineering 131(1), Jan. 2009, downloaded from the Internet from: https://www.researchgate.net/publication/245357093 on May 22, 2025.

Mazzei Injector Performance Table Model 1078-03, Aug. 2014, Mazzei Injector Company, LLC, Bakersfield, California.

Mazzei Injector Datasheet Model 1078, Aug. 2021, Mazzei Injector Company, LLC, Bakersfield, California.

Mazzei Injector Performance Table Model 1584, Sep. 2014, Mazzei Injector Company, LLC, Bakersfield, California.

Mazzei Injector Datasheet Model 1584A, Aug. 2021, Mazzei Injector Company, LLC, Bakersfield, California.

Mazzei Injector Performance Table Model 2081, Sep. 2014, Mazzei Injector Company, LLC, Bakersfield, California.

Mazzei Injector Datasheet Model 2081A, Aug. 2021, Mazzei Injector Company, LLC, Bakersfield, California.

* cited by examiner

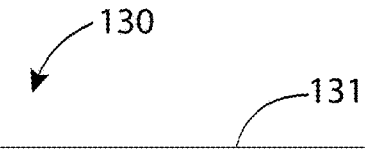

forcing a liquid stream under pressure through a first Venturi injector and a second Venturi injector positioned in series along a liquid conduit, the second Venturi injector is positioned downstream along the liquid conduit from the first Venturi injector, and the second Venturi injector is larger than the first Venturi injector entraining a first fluid into the liquid stream by suctioning the first fluid through a first suction inlet and into a first throat of the first Venturi injector entraining a second fluid into the liquid stream by suctioning the the second fluid through a second suction inlet and into a second throat of the second Venturi injector

| Config. | Venturi No. | Diameter in (cm) | Flow Rate gpm (L/min) | Inlet Pressure psi (kPa) | Outlet Pressure psi (kPa) | Suction Rate scfh (scm/h) |
|---|---|---|---|---|---|---|
| 1 | A | 2.0 (5.08) | 55 (208) | 38 (262) | 35 (241) | 0 |
| | B | 2.0 (5.08) | 55 (208) | 32 (221) | 30 (207) | 0 |
| | C | 2.0 (5.08) | 55 (208) | 14 (97) | 0 | 360 (10.2) |
| 2 | A | 2.0 (5.08) | 55 (208) | 45 (310) | 43 (297) | 0 |
| | B | 1.5 (3.81) | 55 (208) | 42 (290) | 21 (145) | 50 (1.42) |
| | C | 2.0 (5.08) | 55 (208) | 10 (69) | 0 | 240 (6.80) |
| 3 | A | 1.5 (3.81) | 55 (208) | 45 (310) | 26 (179) | 35 (0.99) |
| | B | 2.0 (5.08) | 55 (208) | 24 (166) | 22 (152) | 0 |
| | C | 2.0 (5.08) | 55 (208) | 8 (55) | 0 | 210 (5.95) |
| 4 | A | 1.5 (3.81) | 55 (208) | 45 (310) | 38 (262) | 0 |
| | B | 1.5 (3.81) | 55 (208) | 38 (262) | 18 (124) | 45 (1.27) |
| | C | 2.0 (5.08) | 55 (208) | 8 (55) | 0 | 210 (5.95) |
| 5 | A | 1.0 (2.54) | 55 (208) | 48 (331) | 24 (166) | 20 (0.566) |
| | B | 1.5 (3.81) | 55 (208) | 24 (166) | 10 (69) | 50 (1.42) |
| | C | 2.0 (5.08) | 55 (208) | 8 (55) | 0 | 210 (5.95) |

FIG. 14

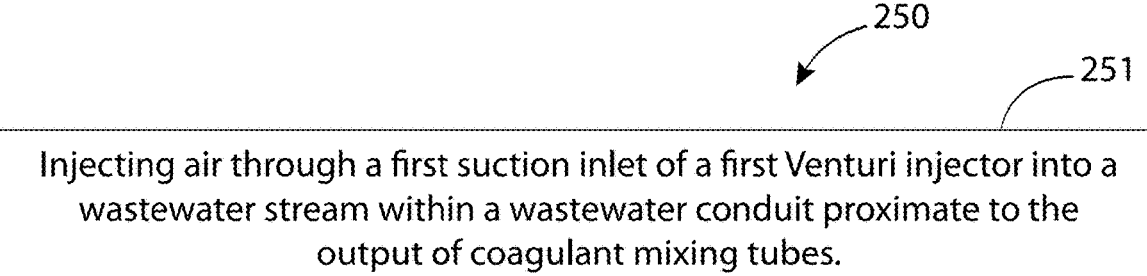

250

251

Injecting air through a first suction inlet of a first Venturi injector into a wastewater stream within a wastewater conduit proximate to the output of coagulant mixing tubes.

252

Injecting air through a second suction inlet of a second Venturi injector into a wastewater stream within the wastewater conduit, in series with and downstream from, the first Venturi injector. The second Venturi injector is positioned before and proximate to a first flocculant injection point.

253

Injecting air through a third Venturi injector into a wastewater stream within the wastewater conduit, in series with and downstream from the second Venturi injector. The third Venturi injector is positioned along the wastewater conduit after the dissipation of a hydrocyclone created vortex and before a flotation tank. The third Venturi injector is larger than the second Venturi injector, and the second Venturi injector is larger than the first Venturi injector.

FIG. 17

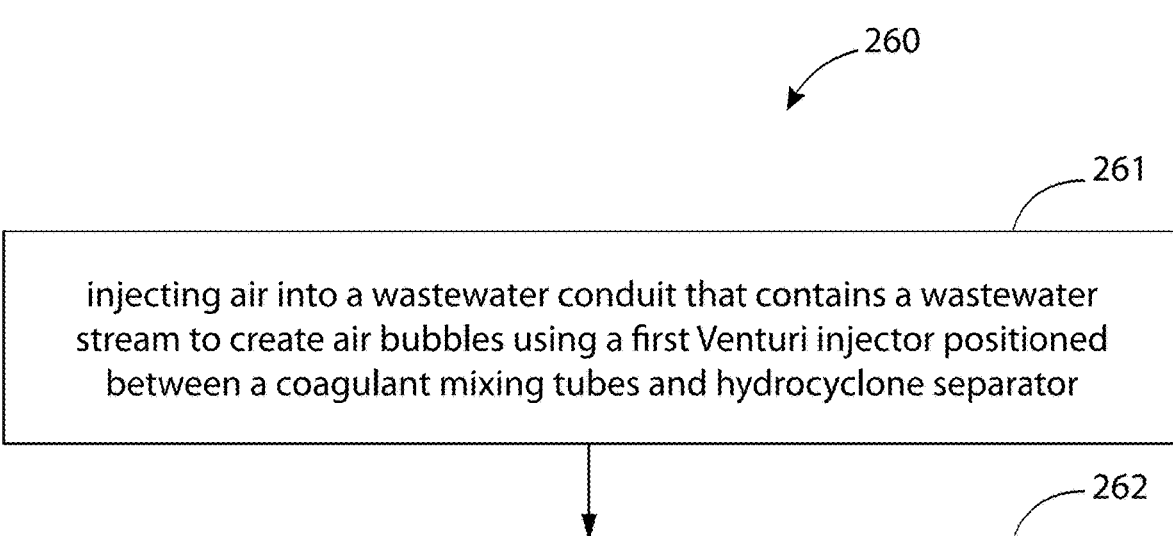

260

261 injecting air into a wastewater conduit that contains a wastewater stream to create air bubbles using a first Venturi injector positioned between a coagulant mixing tubes and hydrocyclone separator

262 injecting air into a wastewater stream to create air bubbles using a second Venturi injector, the second Venturi injector is positioned after the dissipation of a hydrocylcone-created vortex in the wastewater conduit and a flotaton tank, where the second Venturi injector is larger than and downstream from the first Venturi injector.

FIG. 18

SYSTEM USING VENTURI INJECTORS IN SERIES

BACKGROUND

A Venturi injector passively injects fluids from its suction port into liquid passing through its inlet and outlet ports. Venturi injectors are simple mechanical devices. They do not require a power source, and have no moving parts.

The following examples show how various industries use Venturi injectors.

The beverage industry uses Venturi injectors to create carbonated beverages. The Venturi injector passively injects carbon dioxide ($CO_2$) from its suction port and into a beverage stream to create a carbonated beverage. During the production of the beverage, the passively injected $CO_2$ forms bubbles as it mixes with the beverage stream passing through the Venturi injector.

Pool and Spa equipment manufacturers use Venturi injectors to sanitize water. The Venturi injector passively injects ozone ($O_3$) through its suction port and into the water stream passing through the Venturi injector. The resulting $O_3$ bubbles are mixed within the Venturi injector and kill bacteria. Because $O_3$ is unstable, it will decay into harmless oxygen ($O_2$).

In food production, a Venturi injector may be used to passively inject air into a liquid stream or slurry, to improve texture or consistency. For example, air may be injected into an ice cream slurry to help make the ice cream soft, smooth, and creamy.

Wastewater treatment equipment manufacturers use Venturi injectors to purify sanitary wastewater. For example, a Venturi injector may passively introduce air through the Venturi injector's suction port to produce air bubbles and inject them into a wastewater stream mixed with polymers. This results in an air-bubble entrenched wastewater-polymer mixture that is lighter than water. This allows it to be separated from the wastewater using a flotation separation tank where the air-bubble entrenched wastewater-polymer mixture floats to the top of the flotation separation tank.

With few exceptions, most of the applications described above use either a single Venturi injector or use multiple Venturi injectors in parallel.

SUMMARY

In the examples given in the Background section, Venturi injectors are used to passively form gas bubbles in a liquid. The Inventor observed that the performance of the Venturi injector can depend on the suction strength. In addition, he observed that the quantity and quality of the bubbles may be of importance in various applications. The Inventor also observed that various applications could benefit from using multiple Venturi injectors in series along a liquid conduit. He conducted numerous experiments with multiple Venturi injectors, in various configurations, to optimize their performance. Through this experimentation, he discovered that he could optimize the suction strength and the formation of bubbles of two or more Venturi injectors positioned in series along a liquid conduit. He did so by making each successive Venturi injector, downstream, larger than the immediately preceding Venturi injector. In these experiments, the Venturi injectors injected unpressurized air. The experiments showed that making each successive Venturi injector, downstream, larger than the immediately preceding Venturi injector may be particularly helpful for injection of unpressurized gasses. The Inventor envisions that making each successive Venturi injector, downstream, larger than the immediately preceding Venturi injector, will improve the performance of the injection of unpressurized liquids as well as pressurized gasses and liquids. The pressurized liquids or gases can be stored in a pressurized vessel or tank. Unpressurized liquids can be stored in a closed or an open container, such as a bucket with or without a cover, respectively.

The Inventor envisions that this principle can be applied to various industries that use Venturi injection. He believes these industries could benefit from the use of successively-larger Venturi injectors in series. For example, in the beverage industry, successively sizing multiple Venturi injectors as described above, to inject $CO_2$, could help create more controlled and uniform carbonation, and may reduce or eliminate the need for carbonation stones. Carbonation stones are typically made from porous material and are designed to evenly disperse pressurized $CO_2$ into a liquid stream.

In pools and spas, multiple Venturi injectors in series that are successively sized larger downstream could allow for consistent $O_3$ bubble injection in different stages of the water disinfection process. For example, Venturi injectors could be positioned before and after an ultraviolet (UV) sterilization stage to help facilitate more thorough sterilization.

The production of ice cream and other food products could benefit from the injection of air bubbles from multiple Venturi injectors, positioned along the liquid stream or slurry, that are successively sized larger downstream. This could allow for optimization and consistency of air or other gas injection in commercial food preparation processing lines.

Wastewater treatment plants could benefit from using successively-larger Venturi injectors in series. The Venturi injectors could be positioned at different stages along the treatment process to efficiently inject air bubbles into flocculated or coagulated wastewater to help create a lighter-than-water waste product.

The Inventor applied this principle to a wastewater treatment system that uses coagulants and flocculants. Coagulants clump together negatively charged suspended solids by neutralizing their charge and destabilizing the magnetic forces that keep them apart. Flocculants pull microscopically dispersed particles out of suspension to form clusters or flakes called floc. Coagulated and flocculated solids benefit when they are entrenched with microscopic air bubbles. This makes them lighter-than-water and easier to separate.

This wastewater treatment system includes, in order from upstream to downstream, and in series along the wastewater conduit: a coagulant injection point, followed by coagulant mixing tubes, an optional booster pump, an optional first flocculant injection point, optional flocculant mixing tubes, a hydrocyclone separator, a second flocculant injection point after the hydrocyclone separator, and a flotation tank.

A first Venturi injector, may be positioned between the outlet of the coagulant mixing tubes and the booster pump. In addition to successively increasing the size of the Venturi injectors downstream, the Inventor observed, through experimentation, that he could optimize the production of lighter-than-water waste product by placing the first Venturi air injector between the coagulant mixing tubes and the booster pump. Air injected from the first Venturi injector suction inlet port saturates the wastewater stream with microbubbles. Some of these microbubbles attach to the coagulated solids within the air-saturated wastewater stream. The presence of the air bubbles, attached to the surface of the coagulated solids, reduces their density and increases their buoyancy.

A second Venturi injector may, optionally, be positioned after the booster pump and before the first flocculant injection point. A third Venturi injector may be positioned after the second flocculant injection point. The third Venturi injector is larger than the second Venturi injector, and the second Venturi injector is larger than the first Venturi injector. The first Venturi injector injects air into the coagulated wastewater stream. This helps to optimize the entrapment of air into the coagulated waste product to help make it lighter-than-water. The second Venturi injector injects air bubbles into the wastewater stream before the first flocculant injection point. The second Venturi injector adds additional microbubbles to the wastewater stream, in part, to make up for the loss of microbubbles caused by the turbulent nature of the booster pump while further saturating the wastewater stream with additional microbubbles. Air-entrenched coagulated solids, air bubbles from the Venturi injector(s), and flocculant from the first flocculant injector assembly mixes in flocculant mixing tubes. This results in successive layers of flocculant mixed with air-entrenched coagulated particles from the wastewater (i.e., floc), forming numerous flocculant layers of trapped air and coagulated solids. The floc-wastewater mixture enters the inlet of the hydrocyclone separator. The conical shape of the hydrocyclone forms a vortex in the middle that transports lighter suspended solids and water up and out into the wastewater conduit while heavier solids, such as sand or grit, are forced outward to the inner walls of the hydrocyclone and fall to the bottom along the walls by gravity where they may be collected in a tank. The vortex continues into a portion of the wastewater conduit. A second flocculant injection point is located in this portion, where the vortex passively mixes the injected flocculant. The third Venturi injector injects air bubbles into the wastewater stream after the hydrocyclone separator and after the second flocculant injection point. The third Venturi injector is located after the vortex has dissipated further downstream along the wastewater conduit. The microbubbles, resulting from the injection of air from the third Venturi injector, create additional layers of flocculant mixed with air-entrenched coagulated solids over the floc and also aerates the wastewater mixture, engulfing the floc with microbubbles. The trapped microbubbles in these layers increase the buoyancy of the floc. When the aeriated floc-wastewater mixture enters the flotation tank, the aeration microbubbles assist the buoyant floc to float up to the surface of the water inside of the flotation tank, forming the lighter-than-water thickened sludge settles at the top of the tank where it may be removed from for disposal and the product water is drained from the bottom of the tank.

The wastewater treatment process described above does not require any biological processes and has a significantly smaller foot print than conventional municipal wastewater treatment systems. The specific example above, demonstrates one application of using successively larger size Venturi injectors in wastewater treatment. The Inventor envisions that various different types of wastewater treatment plants could benefit from using successively larger size Venturi injectors in series that can inject air or other gases in multiple locations along the treatment process.

For example, dissolved air flotation (DAF) systems typically use an air compressor and a diffusor to inject air into the DAF system which may require a clean water supply and a pressurized tank. A Venturi injector could be used instead of the air compressor and diffusor. Venturi injectors could also be use in earlier stages to mix air or other gases, with the fluid stream, as required. Compared with an air compressor and diffusor, a Venturi air injector is a much simpler device with no moving parts that does not require power, pressurized tank, or clean water but rather uses the same wastewater stream to generate air bubbles.

The Inventor envisions that conventional biological-process based wastewater treatment systems could benefit using successively larger size Venturi injectors. For example, Venturi injectors could be used to introduce air bubbles into a digester, an aeration pond, or at other stages that require the injection of air or oxygen into the wastewater treatment process.

These examples and advantages discussed in this Summary are representative but not all-inclusive. The inventive concept is not limited to the examples given or the discussed advantages. The Detailed Description, drawings, and claims reveal additional features and advantages.

BRIEF DESCRIPTION OF DRAWINGS

FIG. 11 illustrates a flow chart for a method generalized for FIGS. 5, 9, and 10.

FIG. 14 illustrates a table of results for the experimental configurations of FIGS. 12 and 13.

FIG. 17 illustrates a simplified flow chart for a method associated with FIG. 15.

FIG. 18 illustrates a simplified flow chart for a wastewater treatment method.

DETAILED DESCRIPTION

The Detailed Description and claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or." As used throughout this disclosure, "comprise," "include," "including," "have," "having," "contain," "containing" or "with" are inclusive, or open ended, and do not exclude unrecited elements.

The Detailed Description includes the following sections: "Definitions," "General Principles," "Experimental Results," "Examples," "Additional Examples," and "Conclusion and Variations."

Definitions

Venturi Injector: As defined in this disclosure, a Venturi injector is a monolithic body forming a fluid passage that is continuous and axially-aligned, and that converges, without interruption, from a motive-liquid inlet directly to a throat of minimum cross-sectional diameter along the fluid passage, and then diverges, without interruption, directly from the throat into a fluid outlet. The Venturi injector also includes a suction inlet port that extends into the throat and is not aligned axially along the fluid passage.

The device takes advantage of the Venturi effect to suction fluids, such as air, $CO_2$, or a liquid, through the suction inlet port into the throat. The suction occurs thanks to the throat forming the portion of lowest pressure within the axially-aligned fluid passage.

In accordance with the above definition, a Venturi injector is not a Venturi ejector or an eductor. Venturi ejectors and eductors have a motive fluid nozzle, or jet nozzle, that opens into a suction mixing chamber before entering a converging and diverging region. Entrainment of fluids takes place in the suction mixing chamber. The suction mixing chamber is not a throat of minimum cross-sectional diameter. The Venturi injector, of this disclosure, does not have a motive fluid nozzle, jet nozzle, or a suction mixing chamber. Instead, entrainment of fluids takes place in a throat of minimum cross-sectional diameter between converging and diverging regions.

Larger (in reference to Venturi Injectors): As defined in this disclosure, by "larger," when referring to Venturi injectors, the opening width of the junction between the motive-liquid inlet and the converging portion on a particular Venturi injector is larger than the opening width of the junction between the motive-liquid inlet and the converging portion of another Venturi injector. If the motive-liquid inlet is cylindrical, "larger" can refer to the diameter of the motive-liquid inlet of one Venturi injector being larger in diameter than the diameter of the motive-liquid inlet of another Venturi injector.

General Principles

Figure 1:
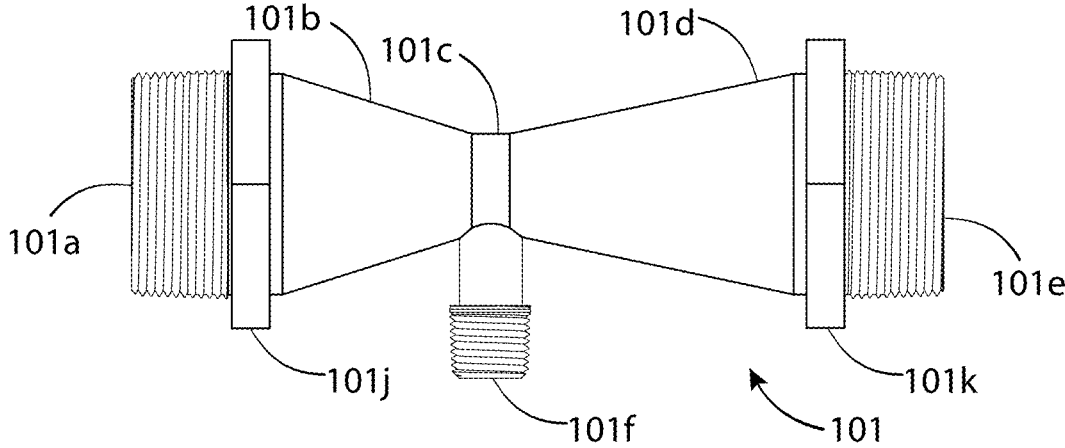
FIGS. 1-4 illustrate, a typical Venturi injector suitable for use in the present disclosure, in front view, top view, section view, and section view with measurement details, respectively.
Figure 2:
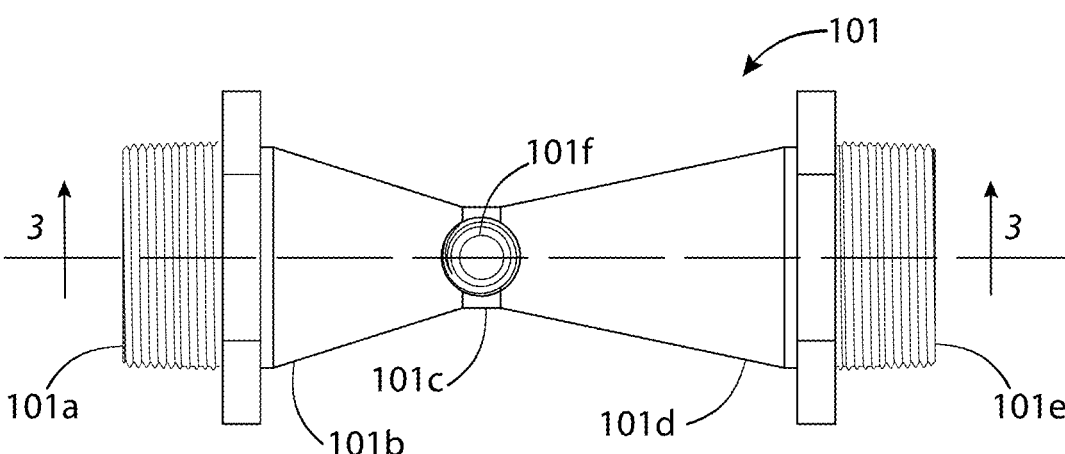
Figure 3:
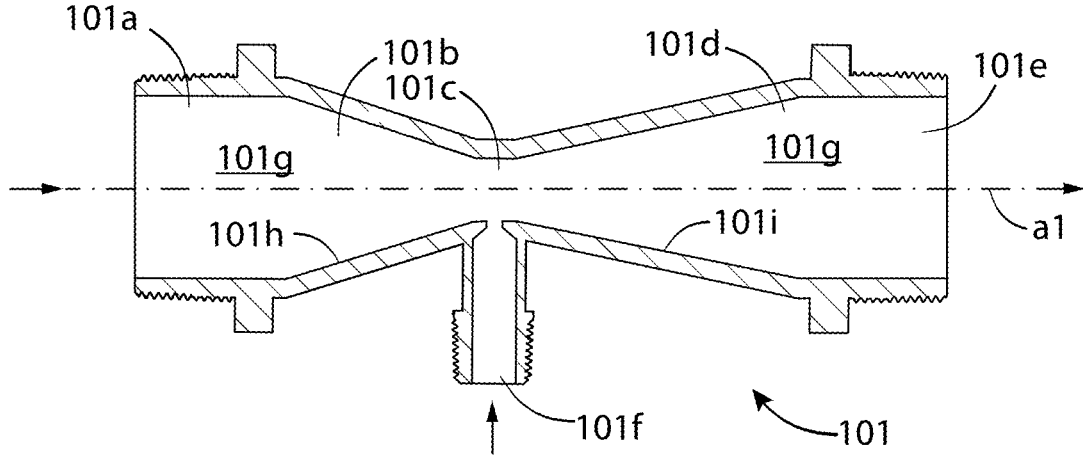

As discussed in the Background section, Venturi injectors passively inject fluids through their suction port into liquid passing through their inlet and outlet ports. FIGS. 1-4 illustrate a typical Venturi injector, Venturi injector 101. Referring to FIGS. 1-3, The Venturi injector 101 includes a motive-liquid inlet 101*a*, a converging portion 101*b*, a throat 101*c*, a diverging portion 101*d*, a fluid outlet 101*e*, and a suction inlet port 101*f*. Referring to FIG. 3, the axially-aligned fluid passage 101*g* extends continuously from the motive-liquid inlet 101*a* directly into the converging portion 101*b*, the throat 101*c*, the diverging portion 101*d*, and the fluid outlet 101*e*. The converging portion 101*b* includes a first interior wall 101*h* that taper inwards, without interruption, directly from the motive-liquid inlet 101*a* directly into the throat 101*c*. The diverging portion 101*d* includes a second interior wall 101*i* that tapers outward, without interruption, directly from the throat 101*c* to the fluid outlet 101*e*.

Continuing to refer to FIG. 3, the axis at of the axially-aligned fluid passage is indicated by a dot-dashed line and with the direction of fluid flow from the motive-liquid inlet 101*a* to the fluid outlet 101*e* indicated by the arrows. The opening of the motive-liquid inlet 101*a* extends transversely, with respect to axis at of the axially-aligned fluid passage 101*g*. The motive-liquid inlet 101*a* extends continuously, without interruption, into the converging portion 101*b*. The opening of the fluid outlet 101*e* extends transversely, with respect to the axis at. The fluid outlet 101*e* extends continuously, and without interruption, from the diverging portion 101*d*.

Figure 4:
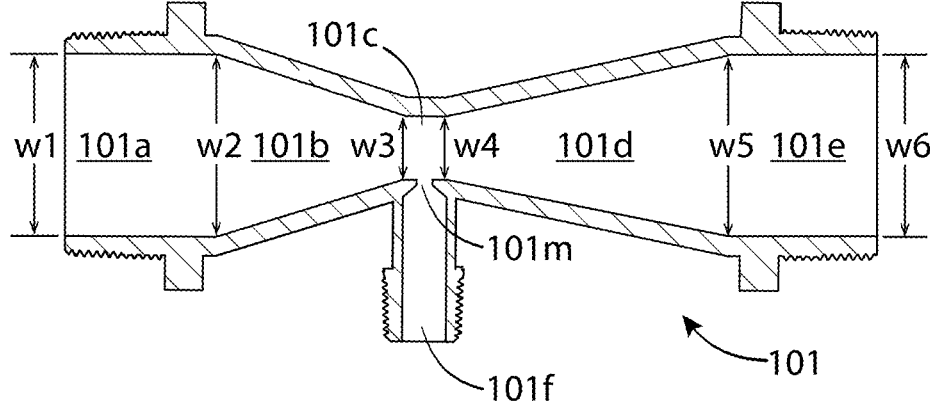

Referring to FIG. 4, the opening width of the motive-liquid inlet 101*a* is width w1. The opening width of the junction between the motive-liquid inlet 101*a* and the converging portion 101*b* is width w2. The opening width at the junction between the converging portion 101*b* and the throat 101*c* is width w3. The opening width at the junction between the throat 101*c* and the diverging portion 101*d* is width w4. The opening width at the junction between the diverging portion 101*d* and the fluid outlet 101*e* is width w5. The opening width of the fluid outlet 101*e* is width w6. Typically, the opening width of the motive-liquid inlet 101*a* and the fluid outlet 101*e* is the same, i.e., typically w1=w6. Typically, the opening width at the junction of the motive-liquid inlet 101*a* and converging portion 101*b* is the same as the opening width at the junction between the diverging portion 101*d* and fluid outlet 101*e*, i.e., typically w2=w5. Typically, the throat maintains a uniform opening width, i.e., typically w3=w4.

Referring to FIG. 3, Venturi injectors passively inject fluid, such as air or liquid, through a suction port positioned at a low-pressure region. The throat, has the smallest cross-sectional area along the entirety of the axially-aligned fluid passage 101*g*. Because of this, the throat forms the region of lowest pressure within the axially-aligned fluid passage 101*g*.

Referring to FIG. 4, the low-pressure region is created when a liquid under pressure, or "motive liquid," enters the inlet of the Venturi injector and increases in velocity as it is forced through the converging region of the Venturi injector. With the increase in velocity, the pressure drops in accordance with the Bernoulli equation. The low pressure within the throat 101*c* pulls fluid, such as air, into throat 101*c* from the suction inlet port 101*f*.

The Inventor, conducted numerous experiments with multiple Venturi injectors positioned in series, in order to optimize the injection of a gas, such as air, into a liquid stream and to optimize the formation of bubbles within the liquid stream. Through this experimentation, he discovered that he could optimize the formation of bubbles and suction strength by making each successive Venturi injector positioned in series along the liquid conduit in the direction of liquid flow (i.e., downstream) larger than the immediately preceding Venturi injector.

Figures 5, 6, 7, 8:
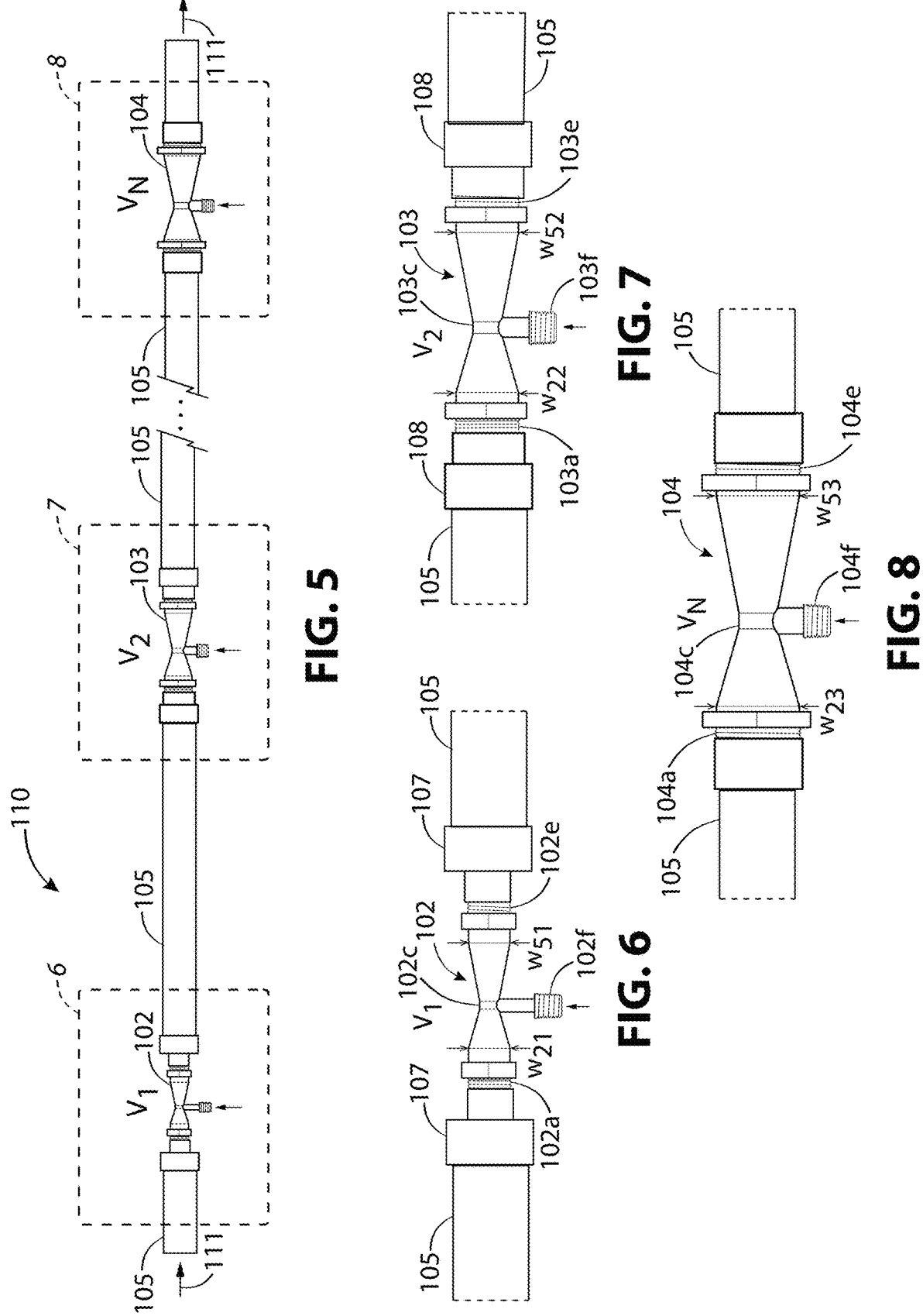
FIG. 5 illustrates, a simplified arrangement showing Venturi injectors in series where each Venturi injector downstream is successively larger than the previous Venturi injector.
FIGS. 6, 7, and 8, illustrate enlarged portion of the first Venturi injector, the second Venturi injector, and the Nth Venturi injector, respectively, of FIG. 5 with the enlarged portions in FIG. 5 designated by the numerals 6, 7, and 8 to indicate FIGS. 6, 7, 8, respectively.
Figure 9:
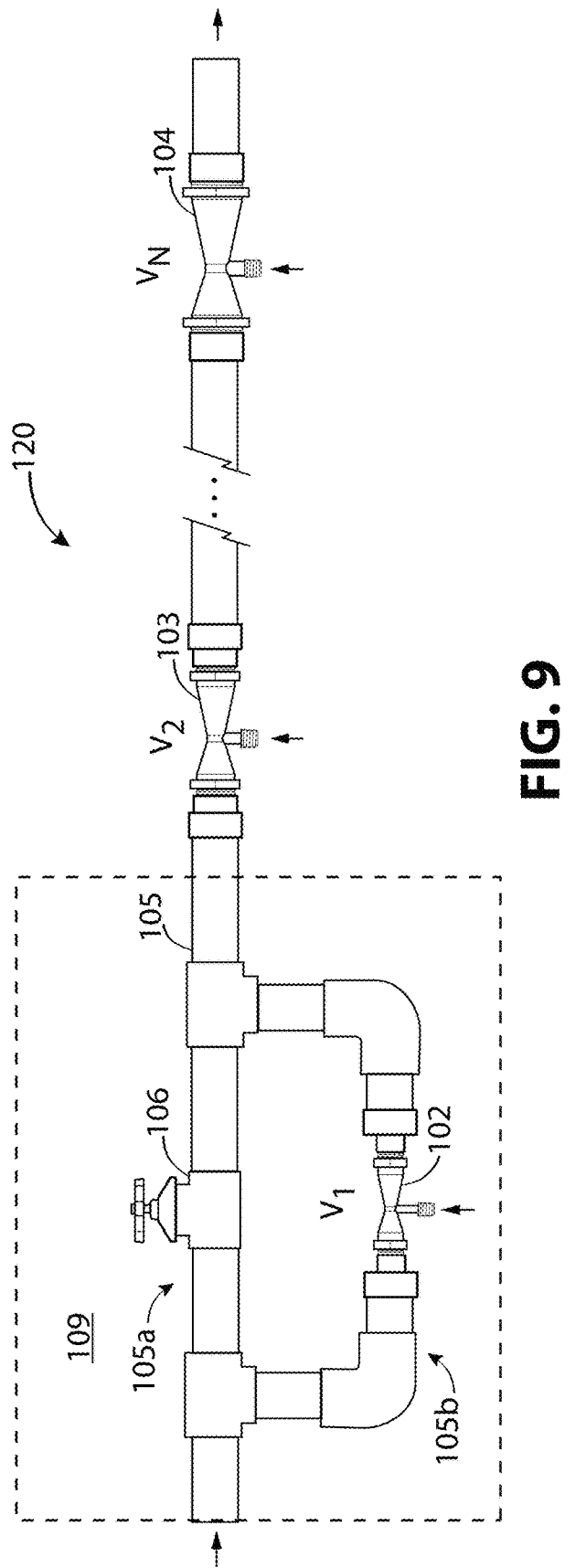
FIG. 9 illustrates, a variation of FIG. 5 where the first upstream Venturi injector is in a bypass configuration.
Figure 10:
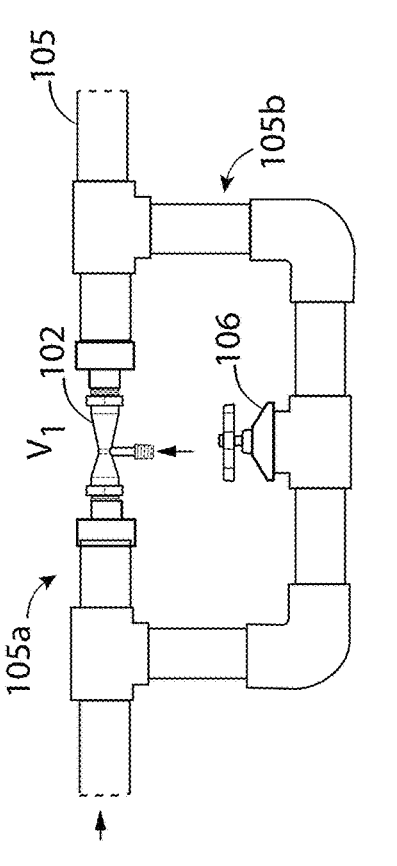
FIG. 10 illustrates an alternative bypass configuration to FIG. 9.

FIGS. 5 and 9 illustrate two examples of a liquid flow system 110, and a liquid flow system 120, respectively, that demonstrate this general principle of two or more Venturi injectors positioned in series along a liquid conduit, where each successive Venturi injector in a direction of liquid flow is larger than an immediately preceding Venturi injector. FIGS. 6-8 illustrate enlarged portions of FIG. 5. FIG. 10 illustrates a variation of the bypass stage 109 of FIG. 9. Referring to FIG. 5, a first Venturi injector 102, designated by $V_1$, a second Venturi injector 103, designated as $V_2$, up to an Nth Venturi injector 104, designated as $V_N$, are positioned in series along a liquid conduit 105. $V_1$, $V_2$, up to $V_N$ is meant to indicate two or more Venturi injectors. Referring to FIGS. 5-8, the series connection is such that the primary liquid stream 111 (FIG. 5) flows, in FIG. 6, from the motive-liquid inlet 102a through the fluid outlet 102e of the first Venturi injector 102. The primary liquid stream 111 (FIG. 5) then flows, in FIG. 7, along the liquid conduit 105 into the motive-liquid inlet 103a and through the fluid outlet 103e of the second Venturi injector 103. If there are additional Venturi injectors, then the primary liquid stream 111 (FIG. 5) would then flow through additional Venturi injectors in the same manner, entering successively, in series, into their motive-liquid inlet and through their fluid outlet until reaching the Nth Venturi injector 104 (FIG. 8). Referring to FIGS. 5 and 8, the primary liquid stream 111 (FIG. 5) enters, in FIG. 8, the motive-liquid inlet 104a and flows through the fluid outlet 104e of the Nth Venturi injector 104.

Referring to FIG. 5, the second Venturi injector 103, which is downstream from the first Venturi injector 102, is larger than the first Venturi injector 102. Any additional Venturi injectors are successively larger downstream than the immediately preceding Venturi injector. The last Venturi injector downstream, represented by the Nth Venturi injector 104 would be the largest. This is illustrated in more detail in the enlarged portions of FIG. 5 illustrated in FIGS. 6, 7, and 8. Referring to FIGS. 6, 7, and 8, width w22 and width w52 of the second Venturi injector 103 of FIG. 7 are wider (larger) than width w21 and width w51 of the first Venturi injector 102 of FIG. 6, respectively. The corresponding widths of each successive downstream Venturi injector would be wider than the immediately preceding Venturi injector, with Nth Venturi injector 104 having a width w23 and width w53 that is wider than the corresponding widths of its immediately preceding Venturi injector.

Referring to FIG. 8, the Nth Venturi injector 104 may be sized so the motive-liquid inlet 104a and the fluid outlet 104e have the same internal width as the liquid conduit 105. This allows the Nth Venturi injector 104 to couple directly to the liquid conduit 105. Referring to FIGS. 6 and 7, the first Venturi injector 102 of FIG. 6 and the second Venturi injector 103 of FIG. 7 are smaller than the internal width of the liquid conduit 105. For this reason, they may be connected to the liquid conduit 105 with reducers. For example, the first Venturi injector 102 of FIG. 6 uses a pair of reducers, reducer 107, and the second Venturi injector 103 of FIG. 7 uses a pair of reducers, reducer 108.

Referring to FIG. 9, the first Venturi injector 102, second Venturi injector 103, and Nth Venturi injector 104, are positioned along the liquid conduit 105 with each successive Venturi injectors in the direction of liquid flow, being larger than the immediately preceding Venturi injector, as discussed for FIGS. 5-8. In FIG. 9 the first Venturi injector 102, while still connected in series along the liquid conduit 105, is connected in a bypass configuration, where some of the liquid is bypassed through the first Venturi injector 102, while the remaining liquid goes through a flow-through portion along the liquid conduit 105. This allows for the possibility for using smaller Venturi injectors that are not rated for the full system flow rate. The amount of liquid diverted to the bypass portion can be controlled by a valve 106 that is positioned in the flow-through portion. Valve 106 is typically a multi-turn throttle valve. The Conclusion and Variations section of this disclosure discusses non-limiting examples of other suitable valves. FIG. 9 shows the valve 106 along the flow-through portion 105a and the first Venturi injector 102 in the bypass portion 105b. FIG. 10 illustrates a variation of the bypass stage 109 of FIG. 9 with the valve 106 placed in the bypass portion 105b and the first Venturi injector 102 positioned directly in the flow-through portion 105a. Referring to FIGS. 9 and 10, while the bypass stage 109 is shown positioned at the first Venturi injector stage of the system, a bypass stage can be positioned at any Venturi injector stage where the flow rate through the Venturi injector in that stage needs to be less than the system flow rate.

Referring to FIGS. 9 and 10, the position of the bypass portion 105b is shown extending downward with respect to the liquid conduit 105. The bypass portion 105b can alternatively extend outward or inward (i.e., coming out of the page or going into the page, respectively) parallel to the liquid conduit 105 and on the same horizontal plane. The bypass portion 105b can also extend upward with respect to the liquid conduit 105.

FIG. 11 is a simplified flow chart that summarizes the method 130, or process, corresponding to FIGS. 5 and 9. In the following description, steps are in reference to FIG. 11, and structural elements are in reference to other indicated figures. Referring to FIGS. 5, 9, and 11, in step 131, a liquid stream is forced, under pressure through a first Venturi injector 102 and a second Venturi injector 103, positioned in series along a liquid conduit. The second Venturi injector 103 is positioned downstream along the liquid conduit from the first Venturi injector. The second Venturi injector 103 is larger than the first Venturi injector 102. Referring to FIGS. 6 and 11, in step 132, a first fluid, such as air, $O_3$ or $CO_2$, is suctioned through a first suction inlet port 102f and into a first throat 102c of the first Venturi injector 102 where it is entrained in the liquid stream. Referring to FIGS. 7 and 11, in step 133, a second fluid is suctioned through a second suction inlet port 103f and into a second throat 103c of the second Venturi injector 103 where it is entrained into the liquid stream. The first fluid and the second fluid could be the same fluid or different fluids. For example, the first suction inlet port 102f and the second suction inlet port 103f might both suction air. As another example, the first suction inlet port 102f might suction air and the second suction inlet port 103f might suction another fluid, such as $CO_2$.

The process of FIG. 11 is not limited to two Venturi injectors and can be applied to two or more Venturi injectors. The process of FIG. 11 can be extended to additional Venturi injectors. For example, a third, fourth, or fifth Venturi injector, where each additional Venturi injector is successively larger downstream from the immediately preceding Venturi injector. The liquid stream would pass through the additional Venturi injectors under pressure, and each additional Venturi injector would entrain a fluid, such as a gas or liquid, into the liquid stream via their respective suction inlet ports and into their respective throats. This is exemplified in FIG. 8 which shows the Nth Venturi injector where a fluid is suctioned through the Nth suction inlet port 104f and into an Nth throat 104*c* of the Nth Venturi injector 104 where it is entrained into the primary liquid stream 111.

The process of FIG. 11 may be alternatively summarized as follows: forcing a liquid stream, under pressure, into the motive-liquid inlets and out the fluid outlets of two or more Venturi injectors positioned in series along a liquid conduit, where each downstream Venturi is successively larger than the immediately preceding Venturi injector, and a fluid, such as a gas or liquid, is entrained within the liquid stream by suctioning the fluid through the corresponding suction inlet port and into the corresponding throat of each of the two or more Venturi injectors.

Experimental Results

Based on experimentation, the Inventor found that he could optimize the suction of fluids at the suction ports of Venturi injectors positioned in series along a liquid conduit by requiring that each successive Venturi injector in the direction of the liquid flow is larger than the immediately preceding Venturi injector. The inventor observed that when a Venturi injector is placed along a liquid conduit, the pressure at the motive-liquid inlet of the Venturi injector increases while the pressure at the motive-fluid outlet of the Venturi injector decreases. The increase in pressure in the inlet of the Venturi injector increases the pressure in the liquid conduit upstream of the Venturi injector. This increase in pressure in the liquid conduit increases the pressure at the motive-fluid outlet of the immediately preceding Venturi injector. Because the pressure is higher at the motive-fluid outlet of the immediately preceding Venturi injector, the flow rate through this Venturi injector should be higher in order to produce the pressure drop necessary to optimize the suction generated through its suction port if the two Venturi injectors are the same size. This would require different flow rates through the two Venturi injectors, but for Venturi injectors in series, the system flow rate through the liquid conduit is the same throughout. A smaller Venturi injector generally requires a lower flow rate through it for a given inlet pressure in order to produce the pressure drop necessary to optimize the suction generated through its suction port when compared to a larger Venturi injector. It is this principle that the Inventor established to determined that the immediately preceding Venturi injector needed to be smaller. The Inventor found he could increase the pressure drop across each Venturi injector, and therefore, the suction through its suction inlet port, by making each Venturi injector smaller than its immediately successive Venturi injector. The Inventor determined that the last Venturi injector furthest downstream may be sized so that it is the largest Venturi injector optimized and rated for the system flow rate in the liquid conduit for a given pressure.

Figure 12:
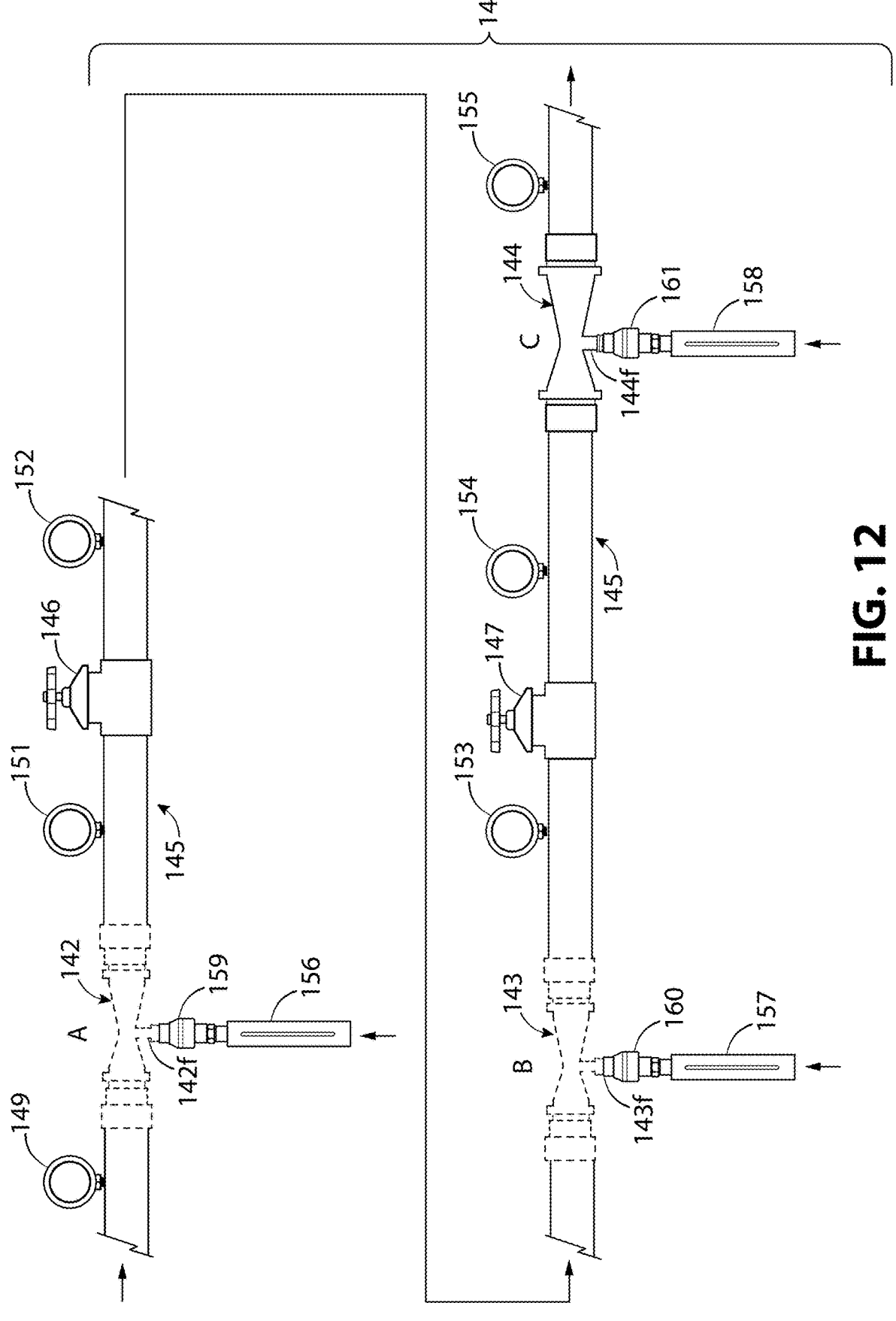
FIG. 12 illustrates the test setup for the first four of five experimental configurations with the Venturi injectors illustrated as dashed lines to designate that the size of the Venturi injector in that position depends on the experimental configuration.
Figure 13:
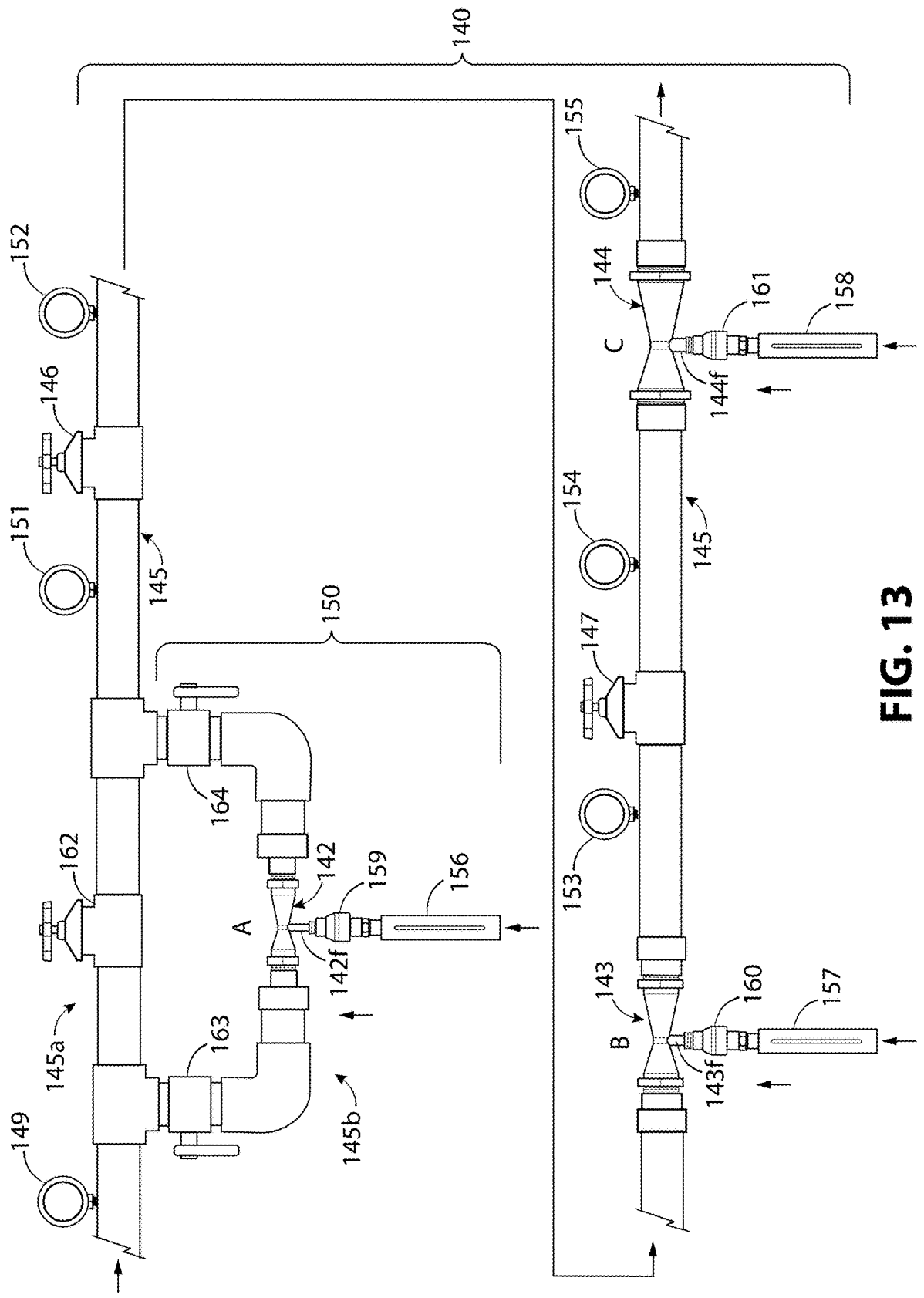
FIG. 13 illustrates the test setup for the fifth experimental configuration.

FIGS. 12 and 13 illustrate an experimental test setup 140 where the Inventor investigated five different configurations utilizing multiple Venturi injectors in series along a liquid conduit. FIG. 12 illustrates the test setup for the first four experimental configurations. FIG. 13 illustrates the test setup for the fifth experimental configuration. Referring to FIGS. 12 and 13, in these five experimental configurations, the Inventor positioned Venturi injectors at three different locations along a liquid conduit 145. These locations are indicated in FIGS. 12 and 13 by the designations A, B, and C, which correspond to Venturi injector A 142, Venturi injector B 143, and Venturi injector C 144. Referring to FIG. 12, for the first four experimental configurations, Venturi injector A 142 and Venturi injector B 143 are illustrated as dashed lines to designate that the size of the Venturi injector used in that position is configuration dependent.

Referring to FIG. 13, Venturi injector A 142 is positioned along a bypass portion 145*b* because the system flow rate exceeded the manufacturer's recommended flow rate for the size used in the fifth experimental configuration. Valve 162 is positioned along a flow-through portion 145*a*. The valve 162 used for this experiment was a multi-turn throttle valve. Additional valves, valve 163 and valve 164, were positioned in the bypass portion 145*b*. Valve 162 controls how much liquid flows through the flow-through portion 145*a*. Whatever liquid does not flow through the flow-through portion 145*a* is diverted through the bypass portion 145*b*. As valve 162 is closed, more liquid is diverted from the flow-through portion 145*a* to the bypass portion 145*b* until valve 162 is fully closed and all of the liquid is forced through the bypass portion 145*b*. With valve 162, valve 163, and valve 164 fully open, the flow rate through the flow-through portion 145*a* and the bypass portion 145*b* depends on the cross-sectional area of each portion. Valve 163 further controls how much liquid flows through the bypass portion 145*b*. As Valve 163 is closed, less liquid is diverted to the bypass portion 145*b* until valve 163 is fully closed and the bypass portion 145*b* is closed off so that all of the liquid is forced through the flow-through portion 145*a*. Adjustments of valve 162 and valve 163 allow for the flow rate through the bypass portion 145*b* to range from 0% to 100% of the system flow rate. Valve 164 is used to adjust the pressure in the bypass portion 145*b* independent of the flow-through portion 145*a*. Closing down valve 164 increases the pressure before the Venturi injector A 142 by creating a bottleneck after Venturi injector A 142. During the testing of the fifth experimental configuration, valve 162 was adjusted so that the flow rate through the bypass portion 145*b* produced the pressure drop necessary to optimize the suction generated through its suction port while valve 163 and valve 164 remained fully open.

Referring to FIG. 12, a first valve 146 is positioned between Venturi injector A 142 and Venturi injector B 143. Referring to FIG. 13, similarly, a first valve 146 is positioned between first Venturi injector assembly 150 and Venturi injector B 143. Referring to FIGS. 12 and 13, a second valve 147 is positioned between Venturi injector B 143 and Venturi injector C 144. The purpose of these valves is to throttle or restrict the flow of the liquid stream through the liquid conduit and increase the head pressure. This is to simulate a liquid conduit 145 with a longer piping system that may include intermediate stages or additional components as well as possible joints and turns in the piping system. Pressure gauges were placed in various positions along the liquid conduit 145. Pressure gauges were placed before and after each Venturi injector to measure the pressure of the inlet and pressure of the outlet for each Venturi injector. The measured inlet and outlet pressures were then used to calculate the pressure drops across the Venturi injectors. The suction generated through the suctions port is optimized when the pressure drop across the Venturi injectors is approximately 50%, meaning that the pressure of the outlet is approximately half as much as the pressure of the inlet of the Venturi injector. The inlet and outlet pressures necessary for a given inlet and outlet pressure, depending on which parameter is determined by the system, is typically specified in the corresponding datasheet for each Venturi injector. A first pressure gauge 149 is positioned before the Venturi injector A 142. The first pressure gauge 149 measures the pressure entering the experimental test setup 140. The test setup is fed by a water pump (not shown). A second pressure gauge 151 is positioned between the Venturi injector A 142 and first valve 146. A third pressure gauge 152 is positioned between first valve 146 and Venturi injector B 143. A fourth pressure gauge 153 is positioned between Venturi injector B 143 and second valve 147. A fifth pressure gauge 154 is positioned between the second valve 147 and Venturi injector C 144. A sixth pressure gauge 155 is positioned after Venturi injector C 144. Unpressurized air from the outside atmosphere is suctioned into suction port 142*f* of Venturi injector A 142 through a flow meter 156 and a check valve 159. Similarly, unpressurized air is suctioned into a suction portion 143*f* of Venturi injector B 143 through a flow meter 157 and a check valve 160. Unpressurized air is suctioned into a suction portion 144*f* of Venturi injector C 144 through a flow meter 158 and a check valve 161. Check valve 159, check valve 160, and check valve 161 prevent the flow of water, flowing through the Venturi injector, from the motive-liquid inlet to the motive-fluid outlet, from escaping through the Venturi injector's suction port during system start up or shut down when the flow rate is below a low threshold and there is not enough pressure to maintain suction. The flow meter 157, which in this example, is an air flow meter, measures air suction through the suction port to confirm optimal suction for the measured inlet and outlet pressures and flow rate of the system. The air flow meter at the suction port measures the operational performance of the Venturi injector.

FIG. 14 illustrates the test results 170 for the five different experimental configurations. Referring to FIG. 14, the first column, labeled "Config." indicates the configuration tested, i.e., configurations 1-5. The second column, labeled, "Venturi No." indicates the position of the Venturi injector (i.e. position A, B, or C) in reference to FIG. 12 for configuration no. 1-4, and in reference to FIG. 13 for configuration no. 5. Continuing to refer to FIG. 14, the third column, labeled "Diameter," is in reference to the nominal inside diameter of the Venturi injector's motive-liquid inlet and fluid outlet. For these five experimental configurations, the Inventor used three different sized Venturi injectors in various combinations. These are model no. 2081A-PP, model no. 1584A-PP, and model no. 1078-03-PP, with nominal motive-liquid inlet and fluid outlet diameters of 2 in (5.08 cm), 1.5 in (3.81 cm), and 1 in (2.54 cm), respectively. Model no. 2081A-PP, model no. 1584A-PP, and model no. 1078-03-PP are manufactured by the Mazzei Injector Company LLC.

The fourth column is the measured flow rate through the liquid conduit 145. In the five experimental configurations, the flow rate was 55 gpm (208 L/min). The fifth column indicates the measured inlet pressure, and the sixth column shows the measured outlet pressure of the Venturi injector. Referring to FIGS. 12 and 13, the inlet pressure for the Venturi injector A 142 is measured by the first pressure gauge 149. The outlet pressure is measured by the second pressure gauge 151. The inlet pressure for the Venturi injector B 143 is measured by the third pressure gauge 152. The outlet pressure is measured by the fourth pressure gauge 153. The inlet pressure for the Venturi injector C 144 is measured by the fifth pressure gauge 154. The outlet pressure is measured by the sixth pressure gauge 155.

Referring to FIG. 14, the seventh column shows the suction rate measured at the suction inlet port of each Venturi injector. Referring to FIGS. 12 and 13, the suction rate for the Venturi injector A 142, Venturi injector B 143, and Venturi injector C 144, is measured by flow meter 156, flow meter 157, and flow meter 158, respectively.

Referring to FIG. 14, the only configuration where all three Venturi injectors' suction inlets produced suction was the fifth configuration, i.e., Config. 5. In Config. 5, the Venturi injectors were sized successively larger downstream along the liquid conduit. Referring to FIG. 13, Venturi injector A 142, Venturi injector B 143, and Venturi injector C 144 have motive-liquid inlets and fluid outlets of 1.0 in (2.54 cm), 1.5 in (3.81 cm), and 2.0 in (5.08 cm), respectively. Referring to FIG. 14, the experiment also demonstrates, in Configs. 2 and 4, regardless of how the Venturi injector A 142 is sized, suction will occur in Venturi injector B 143, and Venturi injector C 144 if Venturi injector C 144 is larger than Venturi injector B 143. Referring to FIG. 12, in both of these experimental configurations, Venturi injector B 143, and Venturi injector C 144 have motive-liquid inlets and fluid outlets of 1.5 in (3.81 cm), and 2.0 in (5.08 cm), respectively. Note that when all three Venturi injectors were the same size as in Config. 1, only the most downstream Venturi injector produced suction at its suction inlet.

The experimental test results confirm the Inventor's observations that were discussed at the beginning of this section. These observations can be confirmed by reviewing the results of FIG. 14. Note that in the fifth experimental configuration, the Inventor chose the particular Venturi injectors for each position because they optimized the pressure drop necessary to generate the maximum amount of air suction through their suction ports, at or below the system flow rate and with the different inlet pressures at each Venturi injector. While in general, a bypass configuration is optional, the Inventor used a bypass configuration for Venturi injector A 142 for the fifth experimental configuration because the system flow rate exceeded the recommended flow rate for that particular Venturi injector size.

EXAMPLES

The Inventor envisions that the general principle that two or more Venturi injectors positioned in series along a liquid conduit, where each downstream Venturi injector is successively larger than the previous Venturi injector, can be applied to various applications that require the injection and mixing of air or other fluids into a liquid stream. For example, in the beverage industry, successively sizing multiple Venturi injectors as described above to inject $CO_2$, could help create more controlled and even carbonation. It may also reduce the need for carbonation stones and allow for multiple injection points at various locations within a process or system. Venturi injectors could be positioned before and after beverage processing stages. An example of a beverage processing stage is a flavoring injection stage where one or more flavor components are injected into the beverage stream.

In pools and spas, multiple Venturi injectors that are successively sized larger downstream could allow for consistent $O_3$ bubble injection in different stages of the water disinfection process. Venturi injectors could be positioned before and after a disinfection stage. For example, Venturi injectors could be positioned before and after a UV sterilization stage. $O_3$ could be injected into a fluid stream within a fluid conduit that feeds the bathing water using a first Venturi injector and a second Venturi injector to create $O_3$ bubbles within the fluid stream. The second Venturi injector would be positioned downstream from and series with the first Venturi injector with respect to the fluid conduit and the second Venturi injector would be larger than the first Venturi injector.

In the production of ice cream, and other food products that could benefit from air injection into a liquid stream, successively larger-sized multiple Venturi injectors could allow for optimization and consistency of air injection in different stages of food production. For example, air, or other fluids, could be injected into a food slurry using two or more Venturi injectors. The Venturi injectors would be positioned in series along the fluid conduit. The injection of air or other gases, such as $CO_2$ into the food slurry could create gas bubbles within the food slurry. Each successive Venturi injector in a direction of liquid flow would be larger than an immediately preceding Venturi injector. Venturi injectors could be positioned before and after different food processing stages of the food manufacturing process. For example, a Venturi injector could be positioned before a heating or cooling stage while another Venturi injector could be positioned after the heating or cooling stage. Similarly, one Venturi injector could be positioned before a flavor injection stage while another Venturi injector could be positioned after the flavor injection stage.

In all of the above examples, multiple Venturi injectors could be helpful when placed between stages that break up or distorts gas bubbles. For example, one Venturi injector could be positioned before a mixing stage and a second Venturi injector could be positioned after the mixing stage where the Venturi injector positioned after the mixing stage is larger than the Venturi injector before the mixing stage.

In the Wastewater treatment industry, multiple Venturi injectors, spaced apart and of successively larger size, could be positioned at different treatment stages to efficiently inject air bubbles into flocculated or coagulated wastewater and to help create a lighter-than-water waste product.

Figure 15:
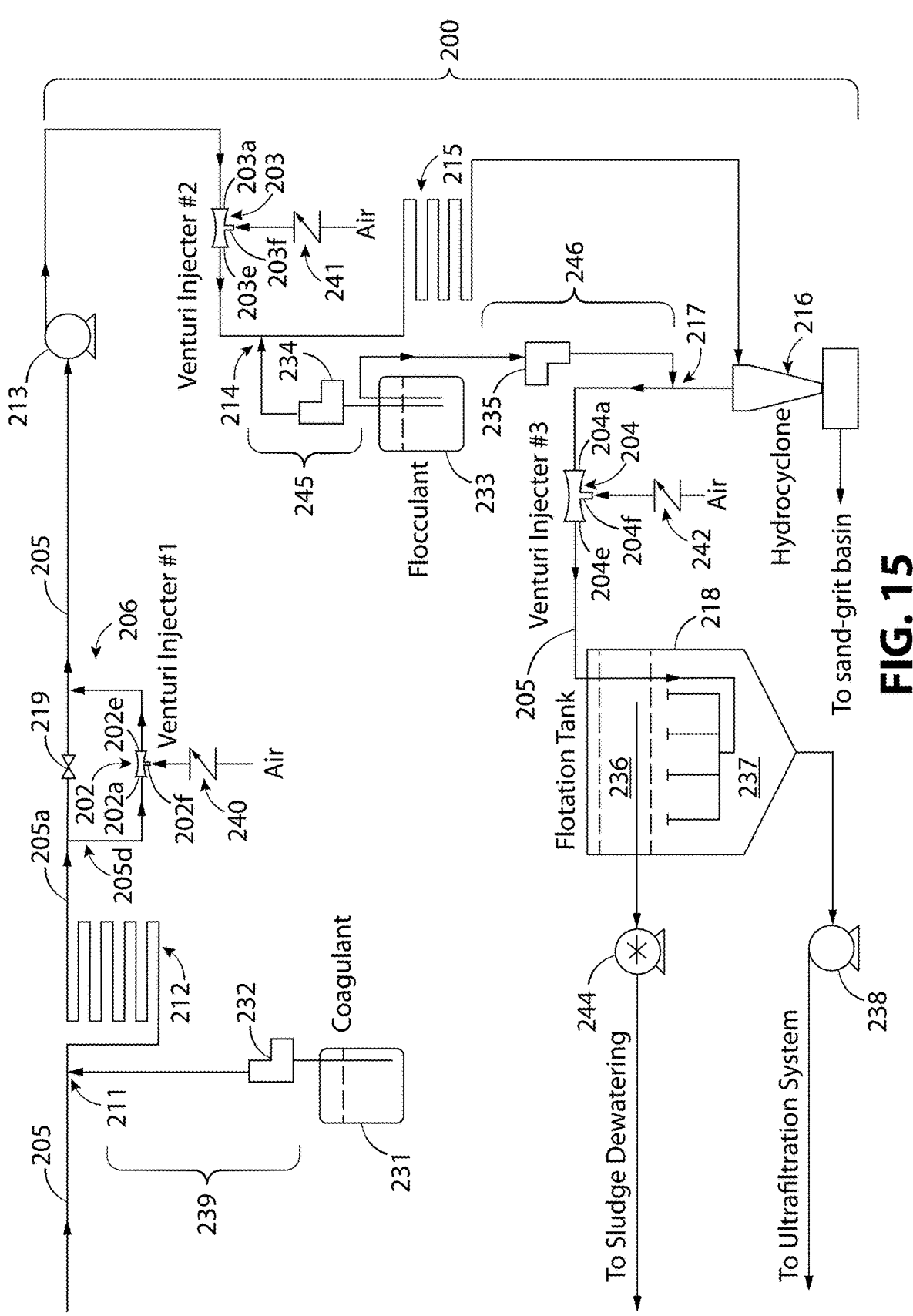
FIG. 15 illustrates an example of the successively-larger Venturi injectors in series used for wastewater treatment and purification.

The Inventor applied this principle of successively-larger multiple Venturi injectors in series to wastewater treatment and purification. An example of such a wastewater treatment system 200 was constructed by the Inventor. A simplified version of the wastewater treatment system 200, is illustrated in FIG. 15. In this wastewater treatment system, Venturi injectors in series, in a wastewater conduit, inject air bubbles into a wastewater stream, to help produce lighter-than-water agglomerated particles. Referring to FIG. 15, as constructed, the wastewater treatment system 200 includes, in order, from upstream to downstream along the wastewater conduit 205: a coagulant injection point 211, followed by coagulant mixing tubes 212, a booster pump 213, a first flocculant injection point 214, flocculant mixing tubes 215, a hydrocyclone separator 216, a second flocculant injection point 217, and followed by a flotation tank 218. The first Venturi injector 202 is positioned between the coagulant mixing tubes 212 and the booster pump 213. The second Venturi injector 203 is positioned between the booster pump 213 and the first flocculant injection point 214. A third Venturi injector 204 is positioned after the second flocculant injection point 217.

The third Venturi injector 204 is larger than the second Venturi injector 203, and the second Venturi injector 203 is larger than the first Venturi injector 202. The meaning of "larger" is defined earlier in the disclosure. The Inventor observed, through experimentation, that in addition to sizing the Venturi air injectors so that each Venturi air injector downstream is larger than the previous Venturi air injector, he could further optimize the production of lighter-than-water waste product by placing the first Venturi injector 202 between the coagulant mixing tubes 212 and the booster pump 213.

The first Venturi injector 202 injects air into coagulant-mixed wastewater stream 205a. This can help optimize the entrainment of air into the coagulated lighter-than-water waste product. The second Venturi injector 203 injects air bubbles into the wastewater stream before the first flocculant injection point 214.

Figure 16:
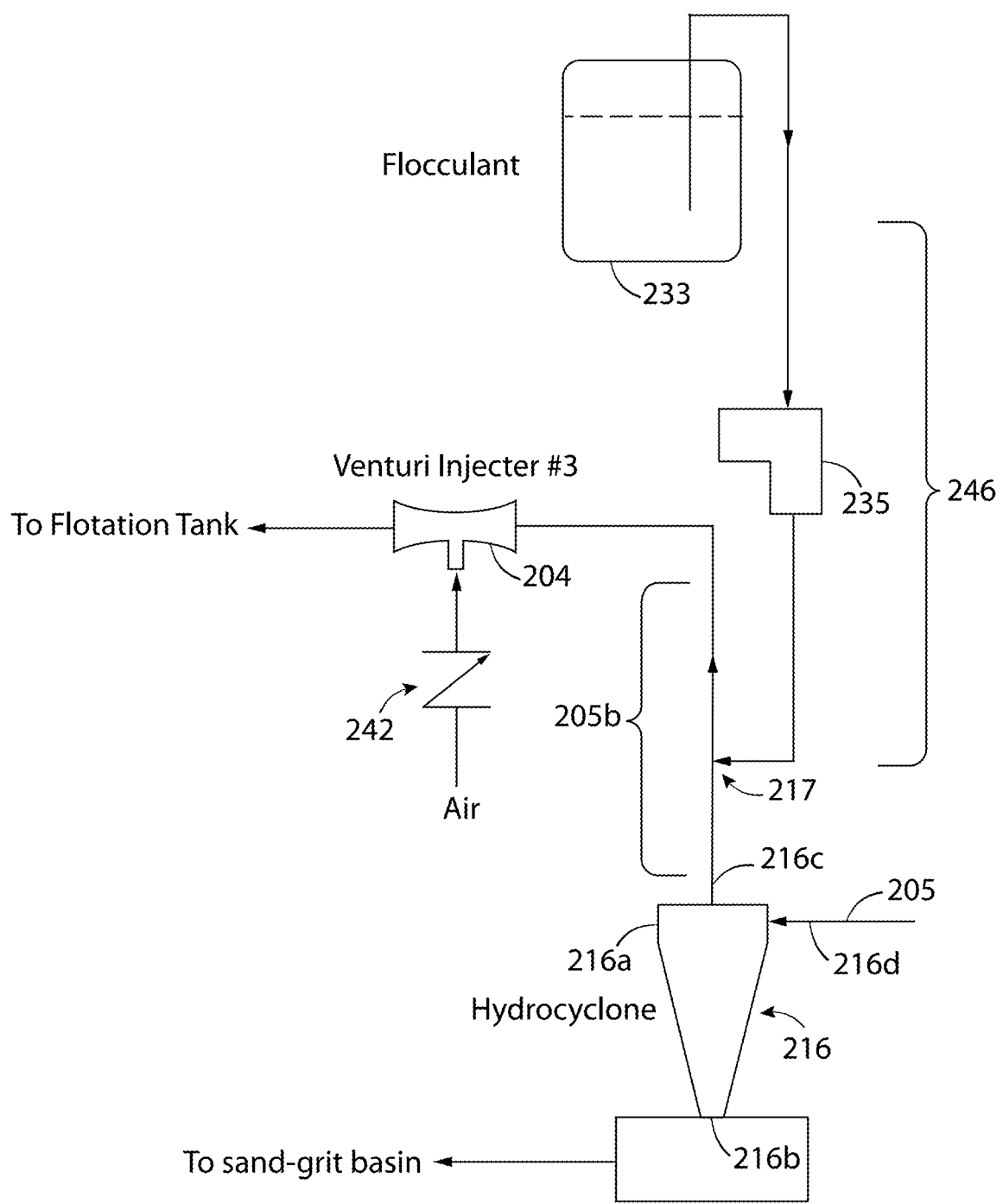
FIG. 16 illustrates an enlarged portion of the wastewater treatment and purification system of FIG. 15, showing the position of the third Venturi injector relative to the hydrocyclone-generated vortex.

The third Venturi injector 204 injects air bubbles into the wastewater stream after a hydrocyclone-created vortex has dissipated. FIG. 16 illustrates the wastewater-conduit portion 205b that includes the hydrocyclone-created vortex, and shows the third Venturi injector 204 located in the wastewater-conduit portion 205c, after the hydrocyclone-created vortex has dissipated.

Referring to FIG. 15, and discussing the wastewater treatment system 200 in more detail, the coagulant is pumped from a coagulant reservoir 231 by a coagulant injector assembly 239, to the coagulant injection point 211. The coagulant injector assembly 239 may include a pump 232 with tubing from the coagulant reservoir 231 to the pump 232. The coagulant injector assembly may also include tubing from the pump 232 to the wastewater conduit 205 at the coagulant injection point 211. The first Venturi injector 202 is shown in a bypass configuration, connected to a bypass portion 205d. A valve 219 in the flow-through portion of the wastewater conduit 205, adjusts the amount of wastewater being diverted to the first Venturi injector 202 by reducing or increasing the flow through the flow-through portion of the wastewater conduit relative to the bypass portion 205d. A check valve 240, which is optional, prevents back flow of the wastewater stream out of the suction inlet port 202f during system start up and shutdown. The injection of microbubbles from the first Venturi injector 202 causes some of the microbubbles to attach to the surface of coagulated wastewater solids. Note that the bypass configuration is optional. The first Venturi injector 202 may be positioned directly along the wastewater conduit 205, rather than a bypass configuration, if it is rated for use with the system flow rate.

Continuing to refer to FIG. 15, the resulting wastewater stream, that includes air-entrenched coagulated wastewater solids, is pumped via booster pump 213. The second Venturi injector 203, which is positioned along the wastewater conduit 205, before the first flocculant injection point 214, may also include a check valve 241, which is optional. The check valve 241 prevents back flow of wastewater out of the suction inlet of the second Venturi injector 203. A first flocculant injector assembly 245 may inject flocculant from the flocculant reservoir 233 into the first flocculant injection point 214. The first flocculant injector assembly 245 may include a pump 234 and tubing. The tubing may be routed from the flocculant reservoir 233 to the pump 234. The tubing may also be routed from pump 234 to first flocculant injection point 214. Flocculant is pumped from a flocculant reservoir 233 via pump 234 to first flocculant injection point 214. The flocculant mixes in flocculant mixing tubes 215 with the microbubbles created by the second Venturi injector 203 and with the coagulated wastewater solids. The second Venturi injector adds additional microbubbles to the wastewater stream, in part, to make up for the loss of microbubbles caused by the turbulent nature of the booster pump while further saturating the wastewater stream with additional microbubbles. Air-entrenched coagulated solids, air bubbles from the Venturi injector(s), and flocculant from the first flocculant injector assembly mixes in flocculant mixing tubes. This results in successive layers of flocculant mixed with air-entrenched coagulated particles from the wastewater (i.e., floc), forming numerous flocculant layers of air and coagulated solids. The resulting wastewater mixture with air-entrenched floc enters a hydrocyclone inlet.

Referring to FIG. 16, the hydrocyclone separator 216 is positioned downstream along the wastewater conduit from the second venturi injector. The hydrocyclone separator includes a hydrocyclone inlet 216d, a first hydrocyclone outlet 216b positioned to remove settleable solids, and a second hydrocyclone outlet 216c positioned to receive a vortex formed within the hydrocyclone separator 216. The hydrocyclone separator 216 includes a frustoconical-shaped vessel 216a. The frustoconical-shaped vessel 216a includes the first hydrocyclone outlet 216b at the bottom (i.e., converging end of the frustoconical-shaped vessel 216a), and the second hydrocyclone outlet 216c, at the opposite end (i.e., top of the frustoconical-shaped vessel 216a). The hydrocyclone inlet 216d is proximate to the top and tangential with the outer radius of the frustoconical-shaped vessel 216a. The wastewater mixture entering the hydrocyclone inlet 216d from the wastewater conduit 205, forms a vortex within the frustoconical-shaped vessel 216a, with heavier settleable solids forced outwards toward the wall and downward toward the bottom of the hydrocyclone separator 216. The settleable solids exit the hydrocyclone separator 216 through the first hydrocyclone outlet 216b. The vortex pushes the remaining fluid, which includes air entrenched microfloc, out of the second hydrocyclone outlet 216c at the top of the hydrocyclone separator 216 into a wastewater-conduit portion 205b.

Referring to FIGS. 15 and 16, flocculant is injected into the second flocculant injection point 217 by the second flocculant injector assembly 246. The second flocculant injector assembly 246, may include a pump 235 and tubing. The tubing may be routed from flocculant reservoir 233 to the pump 235 and may be routed from the pump 235 to the second flocculant injection point 217. Flocculant is pumped from the flocculant reservoir 233 via the pump 235 to the second flocculant injection point 217. Referring to FIG. 16, the second flocculant injection point 217 is positioned within the wastewater-conduit portion 205b that includes the vortex. The vortex helps facilitate mixing of the flocculant that is injected at the second flocculant injection point 217. Referring to FIGS. 15 and 16, the third Venturi injector 204 injects air into the wastewater mixture after the vortex dissipates. The microbubbles, resulting from the injection of air from the third Venturi injector 204, create additional layers of floc over the flocculated solids while also aerating the wastewater mixture with microbubbles. This helps provide for more efficient and faster separation in the flotation tank. A check valve 242 may be optionally positioned in series with the suction inlet of the third Venturi injector 204. The check valve 242 helps to prevent back flow of wastewater from the wastewater stream out of the suction inlet of the third Venturi injector 204 during system start up and shutdown. During system startup and shutdown, there is not sufficient flow rate through the Venturi injector's motive-liquid inlet and fluid outlet, to create suction through the suction port.

Referring to FIG. 15, the wastewater conduit 205 enters the flotation tank 218. When the aeriated wastewater mixture enters the flotation tank 218, the aerating microbubbles force the lighter-than-water agglomerated particles up to the surface of the water inside of the flotation tank 218 where a thickened sludge 236 forms a blanket or a thick layer of concentrated solids, and the product water 237, minus the solids that floated to the surface, remains at the bottom of the flotation tank 218. The thickened sludge 236 is collected from the top surface for disposal while the product water 237 is drained out of the bottom of the flotation tank 218, separating the solids from the water. The product water 237 may be pumped out of the system via a pump 238 to an ultrafiltration system or other system for further purification. The product water may optionally be pumped via a pump 238 to an equalization tank (not shown) before further processing by a media filtration system, an ultrafiltration system, a reverse osmosis system, or other device that has similar ability to further purify the product water 237. The thickened sludge 236 can be optionally transported to a sludge dryer or other process for further dewatering of the thickened sludge 236, if required. The thickened sludge 236 may be pumped by a sludge pump 244, a screw pump, conveyed by a conveyer belt, skimmed off the top and collected via a hopper or trough, or other devices or mechanisms designed to move thickened sludge.

FIG. 17 illustrates a simplified flow chart 250 of a wastewater treatment method of FIG. 15. In the following description of the simplified flow chart 250, structural elements are in reference to FIG. 15 and steps refer to FIG. 17. Referring to FIGS. 15 and 17, in step 251, a first Venturi injector 202 injects air into a wastewater stream within a wastewater conduit 205, between the output of coagulant mixing tubes 212 and the booster pump 213. In step 252, a second Venturi injector 203 injects air into a wastewater stream within the wastewater conduit 205, in series with and downstream from the first Venturi injector 202. The second Venturi injector 203 is positioned after the booster pump 213 and before a first flocculant injection point 214. In step 253, a third Venturi injector 204 injects air into a wastewater stream within the wastewater conduit 205, in series with and downstream from the second Venturi injector 203. The third Venturi injector 204 is larger than the second Venturi injector 203, and the second Venturi injector 203 is larger than the first Venturi injector 202. The third Venturi injector 204 is positioned along the wastewater conduit 205 after the dissipation of a hydrocyclone created vortex and before a flotation tank.

The wastewater treatment method could be further simplified. As an example, FIG. 18 illustrates a simplified wastewater treatment method, wastewater treatment method 260. In the following description of the wastewater treatment method 260, structural elements are in reference to FIG. 15 and steps refer to FIG. 18. Referring to FIG. 18, in step 261, the wastewater treatment method 260, comprises injecting air into a wastewater conduit that contains a wastewater stream to create air bubbles using a first Venturi injector. This first Venturi injector may be positioned between the coagulant mixing tubes and a hydrocyclone separator. For example, the coagulant mixing tubes may be coagulant mixing tubes 212, the hydrocyclone separator may be hydrocyclone separator 216. The first Venturi injector may be first Venturi injector 202 or second Venturi injector 203. In step 261, a second Venturi injector may be positioned after the dissipation of a hydrocyclone-created vortex in the wastewater conduit and before a flotation tank. For example, the flotation tank may be flotation tank 218 and the hydrocyclone created vortex may be positioned in wastewater-conduit portion 205b in FIG. 16. The second Venturi injector 203 is larger than the first Venturi injector 202.

Referring to FIG. 15, the Venturi injectors are connected in series along the wastewater conduit, so that the wastewater stream flows from the motive-liquid inlet 202a to the fluid outlet 202e of the first Venturi injector 202. The wastewater stream then flows from the fluid outlet 202e to the motive-liquid inlet 203a of the second Venturi injector 203, and then through the fluid outlet 203e. The wastewater stream flows from the fluid outlet 203e of the second Venturi injector 203 to the motive-liquid inlet 204a of the third Venturi injector 204, via the hydrocyclone separator 216. The wastewater stream flows from the motive-liquid inlet 204a to the fluid outlet of the third Venturi injector 204. The air is injected through the suction inlet port 202f of the first Venturi injector 202, the suction inlet port 203*f* of the second Venturi injector 203, and the suction inlet port 204*f* of the third Venturi injector 204, and forms bubbles as it mixes with the wastewater stream.

Figure 19:
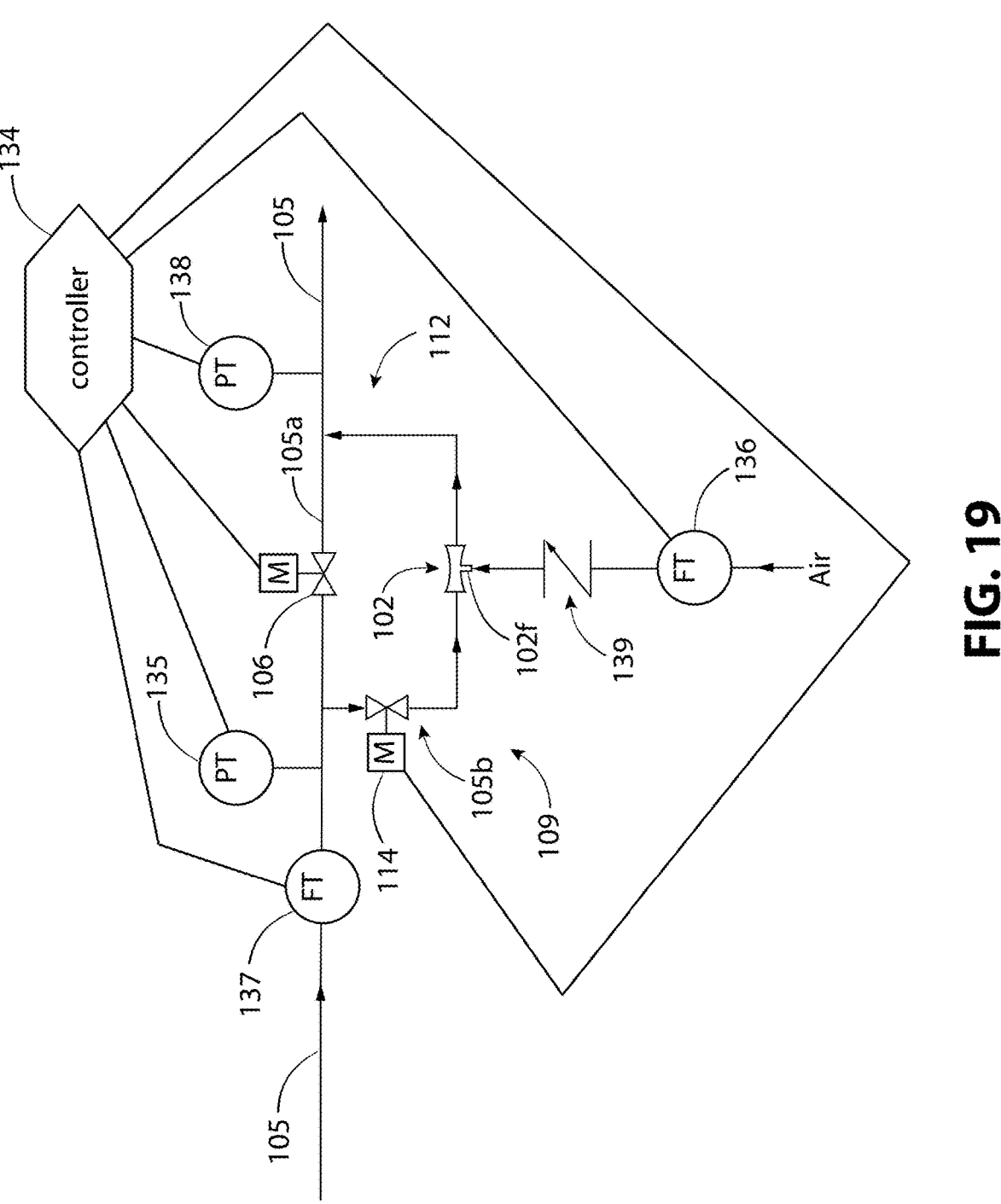
FIG. 19 illustrates a P&ID diagram of a version of the first stage of FIG. 9 modified to allow for optimization of suction through the first Venturi injector during system startup and shutdown.

The Inventor observed that during startup and shutdown, there was not sufficient flow rate or pressure drop across the Venturi injectors to create suction at their suction inlet ports. FIG. 19 illustrates a P&ID diagram of a version of the bypass stage 109 of FIG. 9, modified to allow for optimization of suction through the first Venturi injector 102 during system startup and shutdown. In FIG. 19, a controller 134 controls the valve 106 and controls an optional valve, valve 114, based on input from one or more sensors. With valve 106 fully open, a percentage of the fluid flowing through liquid conduit 105 is diverted from the first Venturi injector 102 and flows through the flow-through portion 105*a*. Valve 114 may be positioned inline with the bypass portion 105*b*. Valve 114, may further restrict fluid flowing through the first Venturi injector 102. Valve 106 and valve 114 in FIG. 19 are illustrated as a motorized actuated valve, such as a motorized multiturn throttle valve. Valve 106 and valve 114 can be any actuated valve appropriate for dynamic adjustment of the flow rate during a startup or shutdown sequence. The controller 134 receives input from a first pressure transmitter 135, a first flow transmitter 136, a second flow transmitter 137, and a second pressure transmitter 138. The first flow transmitter 136, is positioned in line with the first suction inlet port 102*f*, of the first Venturi injector 102. A check valve 139, may be positioned along piping between the first flow transmitter 136, and first suction inlet port 102*f*, to prevent backflow. The second flow transmitter 137 is positioned in line with the liquid conduit 105. The second flow transmitter 137, and first pressure transmitter 135, are positioned along the fluid conduit before the bypass portion 105*b*, and the first Venturi injector 102. The second pressure transmitter 138, is positioned after the bypass portion 105*b*, and the first Venturi injector 102.

Figure 20:
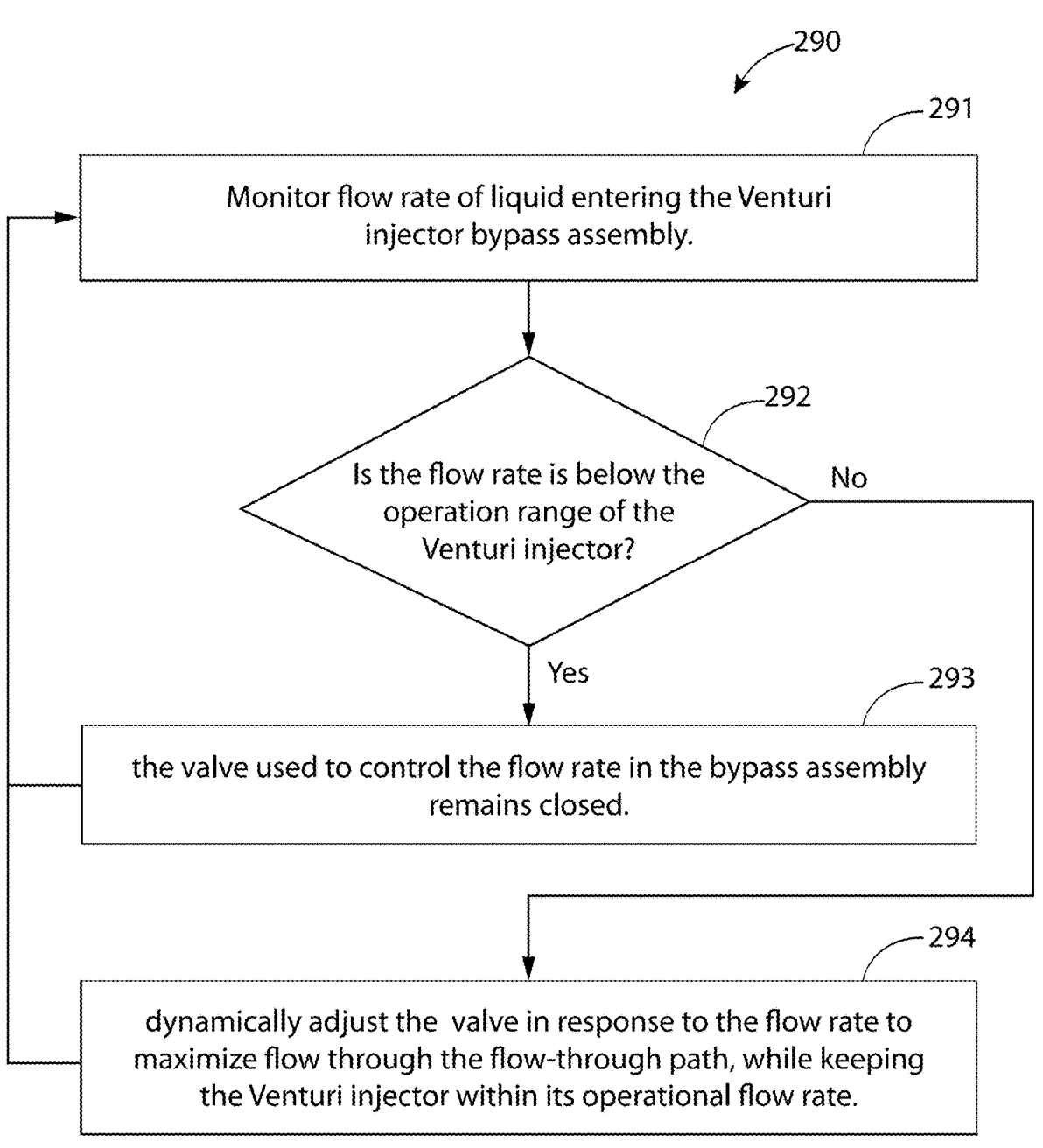
FIG. 20 illustrates a flow chart representing a startup sequence associated with FIG. 19.

FIG. 20 illustrates a flow chart 290 representing a startup sequence associated with FIG. 19. The following description refers to FIGS. 19 and 20. Discussion of structural elements are in reference to FIG. 19, while steps are in reference to FIG. 20. Referring to FIGS. 19 and 20, the valve 106 is closed before startup so that the fluid flows completely through the bypass portion 105*b*. If valve 114 is used, then at startup, valve 114 would be fully open. In step 291, the controller 134, via the second flow transmitter 137, monitors the flow rate through the liquid conduit 105 as it enters the Venturi injector bypass assembly 112. The Venturi injector bypass assembly 112 includes a flow-through portion 105*a* and a bypass portion 105*b*. The flow-through portion 105*a* is along the liquid conduit 105. The bypass portion diverts a portion of the liquid flowing through the liquid conduit 105 to the first Venturi injector 102, and then reintroduces the fluid back into the liquid conduit 105 after it passes through the first Venturi injector 102. In step 292, the controller 134 tests if the flow rate is below the operation range of the first Venturi injector 102. In step 293, if the flow rate is below the operational range of the first Venturi injector 102, then the valve 106 used to control the flow rate in the bypass portion 105*b*, remains closed and if valve 114 is used, it remains open. In step 294, when the flow rate is within the operational range of the first Venturi injector 102, the controller 134 dynamically adjusts the valve 106 and optionally adjusts the valve 114 in response to the flow rate measured by the second flow transmitter 137. It does so to maximize the flow through the flow-through portion 105*a*, while keeping the first Venturi injector 102 within its operational flow range.

The controller 134 could optionally monitor the pressure drop in the first Venturi injector 102, by monitoring the difference in pressure between the second pressure transmitter 138, and the first pressure transmitter 135. This pressure difference, in combination with the flow rate through the first Venturi injector 102, determines the rate of suction at the first suction inlet port 102*f*.

Referring to FIGS. 19 and 20, for the shutdown sequence, as the flow rate drops, the controller may again dynamically adjust the valve 106, in response to the flow rate measured by second flow transmitter 137, to maximize flow through the bypass portion 105*b* instead of the flow-through portion 105*a*, while keeping the first Venturi injector 102 within its operational flow rate. For the shutdown sequence, as the flow rate drops, the controller 134 may again dynamically adjust the valve 106, and optionally adjust the valve 114 in response to the flow rate measured by second flow transmitter 137, to maximize flow through the bypass portion 105*b*, while keeping the first Venturi injector 102 within its operational flow rate, by gradually closing the valve 106 and opening the valve 114, if it is used, until the valve 106 is fully closed and all of the flow is going through the bypass portion 105*b*.

Continuing to refer to FIGS. 19 and 20, first Venturi injector 102 is shown in the bypass portion 105*b* with the valve 106 being in the flow-through portion 105*a*. The first Venturi injector 102 may instead be in the flow-through portion 105*a* and the valve 106 in the bypass portion 105*b*. Step 291, step 292, step 293, and step 294 would still follow the same sequence for this alternative configuration.

ADDITIONAL EXAMPLES

Example 1. A system, comprising: two or more Venturi injectors positioned in series along a liquid conduit, where each successive Venturi injector of the two or more Venturi injectors in a direction of liquid flow is larger than an immediately preceding Venturi injector of the two or more Venturi injectors.

Example 2. The system of example 1, wherein: a Venturi Injector of the two or more Venturi injectors positioned in a bypass configuration.

Example 3. A system, comprising: a first Venturi injector and a second Venturi injector positioned in series along a liquid conduit with the second Venturi injector positioned downstream from the first Venturi injector; and the second Venturi injector is larger than the first Venturi injector.

Example 4. The system of example 3, wherein: the first Venturi injector is positioned in a bypass configuration.

Example 5. The system of example 4, wherein: the bypass configuration includes flow-through portion along the liquid conduit and a bypass portion positioned in parallel with the flow-through portion; a valve is positioned along the flow-through portion; and the first Venturi injector is positioned in the bypass portion.

Example 6. The system of example 4, wherein: the bypass configuration includes flow-through portion along the liquid conduit and a bypass portion positioned in parallel with the flow-through portion; the first Venturi injector is positioned along the flow-through portion; and a valve is positioned in the bypass portion.

Example 7. The system of example 3, further comprising: a third Venturi injector positioned in series with and downstream from the second Venturi injector, the third Venturi injector is larger than the second Venturi injector.

Example 8. A wastewater treatment system, comprising: a first Venturi injector and a second Venturi injector positioned in series along a wastewater conduit with the second Venturi injector positioned downstream from the first Venturi injector, the first Venturi injector and the second Venturi injector are structured and positioned relative to the wastewater conduit, to inject air bubbles into a wastewater stream within the wastewater conduit; and the second Venturi injector is larger than the first Venturi injector.

Example 9. The wastewater treatment system of example 8, further including: a coagulant reservoir that includes coagulant; a coagulant injector assembly connected to the coagulant reservoir and positioned to inject a coagulant into the wastewater conduit at a coagulant injection point; coagulant mixing tubes located downstream from the coagulant injection point and positioned along the wastewater conduit to mix the coagulant with the wastewater stream; and the first venturi injector is located downstream from the coagulant mixing tubes such that air bubbles injected into the wastewater stream from the first Venturi injector will mix with the coagulant.

Example 10. The wastewater treatment system of example 9, further including: a hydrocyclone separator positioned downstream along the wastewater conduit from the first venturi injector, the hydrocyclone separator includes a hydrocyclone inlet, a first hydrocyclone outlet positioned to remove settleable solids and a second hydrocyclone outlet positioned for receiving a vortex formed within the hydrocyclone separator; a flocculant reservoir that includes flocculant; a flocculant injector assembly connected to the flocculant reservoir and positioned to inject the flocculant from the flocculant reservoir into a first wastewater-conduit portion containing the vortex; and the second venturi injector is located downstream along the wastewater conduit from the first wastewater-conduit portion into a second wastewater-conduit portion not containing the vortex.

Example 11. The wastewater treatment system of example 9, further including: a flocculant reservoir that includes flocculant; a first flocculant injector assembly connected to the flocculant reservoir and positioned to inject the flocculant from the flocculant reservoir into a first flocculant injection point in the wastewater conduit downstream from the first Venturi injector; the second Venturi injector is position upstream from the first flocculant injection point such that that air bubbles resulting from air injected into the wastewater stream from the second Venturi injector will mix with the flocculant injected by the first flocculant injector assembly; a hydrocyclone separator positioned downstream along the wastewater conduit from the second venturi injector, the hydrocyclone separator includes a hydrocyclone inlet, a first hydrocyclone outlet positioned to remove settleable solids and a second hydrocyclone outlet positioned for receiving a vortex formed within the hydrocyclone separator; a second flocculant injector assembly connected to the flocculant reservoir and positioned to inject the flocculant from the flocculant reservoir into a first wastewater-conduit portion containing the vortex; and a third venturi injector, the third venturi injector is larger than the second Venturi injector, the third venturi injector is located downstream along the wastewater conduit from the first wastewater-conduit portion into a second wastewater-conduit portion not containing the vortex.

Example 12. The wastewater treatment system of example 11, further including: a booster pump positioned between the first Venturi injector and the second Venturi injector.

Example 13. The wastewater treatment system of example 12, wherein: the flocculant reservoir is a first flocculant reservoir and a second flocculant reservoir, the first flocculant injector assembly is connected to the first flocculant reservoir, and the second flocculant injector assembly is connected to the second flocculant reservoir.

Example 14. The wastewater treatment system of example 12, further including: a flotation tank structured to separate product water from thickened sludge, the flotation tank is positioned downstream from the third Venturi injector.

Example 15. The wastewater treatment system of example 8, further including: a hydrocyclone separator positioned downstream along the wastewater conduit from the first venturi injector, the hydrocyclone separator includes a hydrocyclone inlet, a first hydrocyclone outlet positioned to remove settleable solids and a second hydrocyclone outlet positioned for receiving a vortex formed within the hydrocyclone separator; a flocculant reservoir and a pump structurally connected to the flocculant reservoir and positioned to inject flocculant into a first wastewater-conduit portion containing the vortex; and the second venturi injector is located downstream along the wastewater conduit from the first wastewater-conduit portion into a second wastewater-conduit portion not containing the vortex.

Example 16. A wastewater treatment method, comprising: injecting air bubbles into a wastewater stream within a wastewater conduit using a first Venturi injector and a second Venturi injector to create air bubbles within the wastewater stream; and the second Venturi injector is positioned downstream from and in series with the first Venturi injector, and the second Venturi injector is larger than the first Venturi injector.

Example 17. A wastewater treatment method of example 16, wherein: the first Venturi injector and the second Venturi injector are connected in series along the wastewater conduit so that the wastewater stream flows from a first motive-liquid inlet to a first fluid outlet of the first Venturi injector followed by a second motive-liquid inlet to a second fluid outlet of the second Venturi injector.

Example 18. The wastewater treatment method of example 17, wherein: injecting air into the wastewater conduit takes place through a first suction inlet port of the first Venturi injector and through a second suction inlet port of the second Venturi injector.

Example 19. The wastewater treatment method of example 18, wherein: the air bubbles include first air bubbles and second air bubbles, the first air bubbles result from injecting air into the wastewater stream using the first Venturi injector and the second air bubbles result from injecting air into the wastewater stream using the second Venturi injector; the first Venturi injector is positioned after coagulant mixing tubes such that the first air bubbles mix with coagulated solids exiting the coagulant mixing tubes; and the second Venturi injector is positioned in relation to a first flocculant injection point such that the second air bubbles mix with flocculant from the first flocculant injection point.

Example 20. A wastewater treatment method, comprising: injecting air through a first suction inlet of a first Venturi injector into a wastewater stream within a wastewater after an output of coagulant mixing tubes; injecting air through a second suction inlet of a second Venturi injector into the wastewater stream within the wastewater conduit, in series with and downstream from, the first Venturi injector, the second Venturi injector is positioned before a first flocculant injection point; injecting air through a third Venturi injector into the wastewater stream within the wastewater conduit, in series with and downstream from the second Venturi injector; and the third Venturi injector is larger than the second Venturi injector, and the second Venturi injector is larger than the first Venturi injector.

Example 21. The wastewater treatment method of example 20, wherein: the third Venturi injector is positioned along the wastewater conduit after dissipation of a hydrocyclone created vortex and before a flotation tank.

Example 22. A wastewater treatment method, comprising: forcing a liquid stream under pressure through a first Venturi injector and a second Venturi injector positioned in series along a liquid conduit, the second Venturi injector is positioned downstream along the liquid conduit from the first Venturi injector, and the second Venturi injector is larger than the first Venturi injector.

Example 23. The wastewater treatment method of example 22, further comprising: entraining a first gas into the liquid stream by suctioning the first gas through a first suction inlet and into a first throat of the first Venturi injector.

Example 24. The wastewater treatment method of example 23, further comprising: entraining a second gas into the liquid stream by suctioning the second gas through a second suction inlet and into a second throat of the second Venturi injector.

Example 25. The wastewater treatment method of example 23, further comprising: further entraining the first gas into the liquid stream by suctioning the first gas through a second suction inlet and into a second throat of the second Venturi injector.

Example 26. The system of example 3, wherein: the first Venturi injector includes a first motive-liquid inlet and a first fluid outlet and the second Venturi injector includes a second motive-liquid inlet and a second fluid outlet; and the first fluid outlet is connected in series with the second motive-liquid inlet.

Example 27. The system of example 7, wherein: the first Venturi injector includes a first motive-liquid inlet and a first fluid outlet, the second Venturi injector includes a second motive-liquid inlet and a second fluid outlet, and the third Venturi injector includes a third motive-liquid inlet and a third fluid outlet; and the first fluid outlet is connected in series with the second motive-liquid inlet and the second fluid outlet is connected in series with the third motive-liquid inlet.

Example 28. The system of example 1, wherein: each Venturi injector of the two or more Venturi injectors include a motive-liquid inlet and a fluid outlet; and each successive motive-liquid inlet is in series along the fluid conduit in a direction of liquid flow with the fluid outlet of immediately preceding Venturi injector of the two or more Venturi injectors.

Example 29. The system of Example 1, wherein: each Venturi injector of the two or more Venturi injectors is monolithic body forming a fluid passage that is continuous and axially-aligned, and that converges, without interruption, from a motive-liquid inlet directly to a throat, of minimum diameter along the fluid passage, and then diverges, without interruption, directly from the throat into a fluid outlet, and a suction inlet port, not aligned axially along the fluid passage, extends into the throat.

Example 30. The system of Example 3, wherein: the first Venturi injector and the second Venturi injector each are a monolithic body forming a fluid passage that is continuous and axially-aligned, and that converges, without interruption, from a motive-liquid inlet directly to a throat, of minimum diameter along the fluid passage, and then diverges, without interruption, directly from the throat into a fluid outlet, and a suction inlet port, not aligned axially along the fluid passage, extends into the throat.

Example 31. The wastewater treatment system of Example 8, wherein: the first Venturi injector and the second Venturi injector each are a monolithic body forming a fluid passage that is continuous and axially-aligned, and that converges, without interruption, from a motive-liquid inlet directly to a throat, of minimum diameter along the fluid passage, and then diverges, without interruption, directly from the throat into a fluid outlet, and a suction inlet port, not aligned axially along the fluid passage, extends into the throat.

Example 32. The wastewater treatment system of Example 11, wherein: the first Venturi injector, the second Venturi injector, and the third Venturi injector each are a monolithic body forming a fluid passage that is continuous and axially-aligned, and that converges, without interruption, from a motive-liquid inlet directly to a throat, of minimum diameter along the fluid passage, and then diverges, without interruption, directly from the throat into a fluid outlet, and a suction inlet port, not aligned axially along the fluid passage, extends into the throat.

Example 33. A system, comprising: two or more Venturi injectors positioned in series along a liquid conduit, where each successive Venturi injector of the two or more Venturi injectors, in a direction of liquid flow, includes a motive-liquid inlet larger than a motive-liquid inlet of an immediately preceding Venturi injector of the two or more Venturi injectors.

Example 34. A method for carbonating a beverage, comprising: injecting $CO_2$ into a beverage stream within a fluid conduit using a first Venturi injector and a second Venturi injector to create carbonation within the beverage stream; and the second Venturi injector is positioned downstream from and in series with the first Venturi injector with respect to the fluid conduit, and the second Venturi injector is larger than the first Venturi injector.

Example 35. The method of example 34, wherein: the first Venturi injector is positioned before a beverage processing stage and the second Venturi injector is positioned after the beverage processing stage.

Example 36. The method of example 35, wherein: the beverage processing stage is a flavoring injection stage.

Example 37. A method for sanitizing bathing water, comprising: injecting $O_3$ into a fluid stream within a fluid conduit that feeds the bathing water using a first Venturi injector and a second Venturi injector to create $O_3$ bubbles within the fluid stream; and the second Venturi injector is positioned downstream from and series with the first Venturi injector with respect to the fluid conduit and the second Venturi injector is larger than the first Venturi injector.

Example 38. The method of example 37, wherein: the first Venturi injector is positioned before a UV sterilization stage and the second Venturi injector is positioned after the UV sterilization stage.

Example 39. The method of example 37, wherein the first Venturi injector is position before a water disinfection stage and the second Venturi injector is positioned after the water disinfection stage.

Example 40. A method for injecting a gas into a food slurry, comprising: injecting air into the food slurry within a fluid conduit using a first Venturi injector and a second Venturi injector to create gas bubbles within the food slurry; and the second Venturi injector is positioned downstream from and in series with the first Venturi injector with respect to the fluid conduit and the second Venturi injector is larger than the first Venturi injector.

Example 41. The method of example 41, wherein the first Venturi injector is positioned before a food processing stage and the second Venturi injector is positioned after the food processing stage.

Example 42. The method of example 41, wherein the food processing stage is a heating or cooling stage.

Example 43. The method of example 41, wherein the food processing stage is a flavor injection stage.

CONCLUSION AND VARIATIONS

The Summary, Detailed Description, and figures described a system with two or more Venturi injectors positioned in series along a liquid conduit, where each successive Venturi injector of the two or more Venturi injectors in a direction of liquid flow is larger than an immediately preceding Venturi injector of the two or more Venturi injectors. This disclosure provides examples of devices, components, and configurations to help the reader understand the described general principles. The following are examples of variations and combinations of different components, structures, and features that still adhere to the general principles.

FIGS. 1-4 show an example of a Venturi injector suitable for use with the various examples of this disclosure. The converging portion of the Venturi injector may be frusto-conical with the base of the frustoconical-shape facing the motive-liquid inlet. The narrow portion of the frustoconical shape would converge directly, without interruption, into the Venturi injector's throat. Similarly, the diverging portion may be frustoconical, with the base of the frustoconical shape facing the fluid outlet and the narrow portion diverging directly, without interruption, from the Venturi injector's throat. The motive-liquid inlet and fluid outlet may be cylindrical.

The Venturi injector's converging and diverging portions need not be smooth. For example, the converging and diverging portions may include vanes structured to induce or alternatively, to minimize rotational motion of liquid passing through the Venturi injector. Referring to FIG. 4, for a motive-liquid inlet 101*a* that is cylindrical, the opening width of the motive-liquid inlet 101*a*, width w1, would equal the opening width of the junction between the motive-liquid inlet 101*a* and the converging portion 101*b*, width w2. For a fluid outlet 101*e* that is cylindrical, the opening width at the junction between the diverging portion 101*d* and the fluid outlet 101*e*, width w5 would equal the opening width of the fluid outlet 101*e*, w6. Referring to FIG. 1, the outside surface of the motive-liquid inlet 101*a* and fluid outlet 101*e* are illustrated as threaded. They include flanged nut 101*j* and flanged nut 101*k* that act as stops. They also allow use of a tool or wrench with the Venturi injector 101. These flanged nuts are optional. The outside surfaces of the motive-liquid inlet 101*a* and fluid outlet 101*e* need not be threaded. They can be smooth to allow the Venturi injector to be press fitted and cemented into a pipe. The Venturi injector may include flanges that are structured to bolt to a flanged pipe. The Venturi injector may include a bayonet closure. FIG. 4 shows the suction inlet opening 101*m* into the throat 101*c* as a constriction. This is one example of a suction inlet to throat interface. There are other examples of Venturi injectors where this constriction may not be required.

FIGS. 5 and 9 illustrate examples of general principles developed by the Inventor. The relative size of the liquid conduit 105, between first Venturi injector 102 and second Venturi injector 103, is to accommodate the page size of the illustration. The length of the liquid conduit 105 can vary according to the individual application and acceptable pressure drops. The liquid conduit 105 between first Venturi injector 102 and second Venturi injector 103, is illustrated as linear. The liquid conduit 105 may include curves or may include serpentine-shaped portions, depending on the application. In addition, other components may be positioned between first Venturi injector 102 or second Venturi injector 103. For example, a mixing device, pump, or separation device, may be positioned between first Venturi injector 102 and second Venturi injector 103, depending on the application. The same variations discussed in this paragraph may also apply between other Venturi injectors positioned along the liquid conduit 105. The structure, methods, and concepts illustrated and discussed from FIGS. 5 and 9 can be applied to as few as two Venturi injectors or two or more Venturi injectors.

Valve 106, in FIGS. 9 and 10, and valve 219 in FIG. 15, may be a manual valve or may be an actuated valve for external control. The external control device could be tied to a feedback control system that controls the actuation and adjustment of the valve or valves, based on feedback from one or more sensors, such as a pressure gauge, flow meter, or mass flow meter. Examples of suitable valves for manual control may include, but are not limited to: single-turn throttle valves, multi-turn throttle valves, ball valves, butterfly valves, gate valves, plug valves, or globe valves. Examples of suitable actuated valves may include, but is not limited to throttle valves, ball valves, plug valves, butterfly valves, gate valves, globe valves, needle valves, or angle seat valves. Depending on the type of valve, the actuator could be a linear actuator or a rotary actuator. The power source for the actuator could be electric or pneumatic.

Check valves could optionally be connected in series with the first suction inlet port 102*f*, second suction inlet port 103*f*, and Nth suction inlet port 104*f* in FIGS. 6, 7, and 8, respectively, to prevent back flow of liquid flowing through the system out through the suction inlet ports. This back flow may occur during startup and shutdown because the liquid flowing through the fluid conduit does not have sufficient flow rate to create suction through the first suction inlet port 102*f*, second suction inlet port 103*f*, and Nth suction inlet port 104*f* in FIGS. 6, 7, and 8, respectively.

The fluid conduit referred to throughout this disclosure is a piping system with Venturi injectors positioned in series along the piping system and with the Venturi injectors being successively larger downstream. The piping of the fluid conduit may be any piping suitable for the task. For example, for food or beverage processing the piping could be stainless steel or plastic, such as polyethylene, that is rated for use with food. For wastewater treatment, the piping could be any material suitable for use with chemicals and conditions of the wastewater treatment process. For example, poly-vinyl chloride (PVC) or chlorinated poly-vinyl chloride (CPVC) may be suitable for many of the treatment stages. If potable water is produced, copper or cross-linked polyethylene (PEX), may be suitable for transporting the potable water.

FIG. 11 illustrates a method with three steps. An alternative to FIG. 11 can be expressed as step 131, without mention of step 132 and step 133. An additional alterative to FIG. 11 can be expressed as step 131 and step 132 without mention of step 133. Another alternative to FIG. 11 can be expressed as step 131 and step 133, without mention of step 132.

FIG. 15 illustrates flocculant reservoir 233 being shared between the pump 234 and pump 235. Pump 234 feeds the first flocculant injection point 214. Pump 235 feeds the second flocculant injection point 217. The flocculant reservoir 233 need not be shared. Pump 234 and pump 235 may be fed from separate flocculant reservoirs.

FIG. 15 shows a simplified version of a wastewater treatment system that was built by the Inventor. The Inventor envisions other wastewater treatment systems that are within the principles of this disclosure. For example, the system might include two, rather than three, Venturi injectors. For example, the system might include the first Venturi injector proximate to the outlet of the coagulant mixing tubes 212, and the third Venturi injector 204 positioned after the post-hydrocyclone vortex has dissipated. It would not include the second Venturi injector 203. The third Venturi injector 204 would be sized larger than the first Venturi injector 202. Alternatively, the system might include the second Venturi injector 203 and the third Venturi injector 204, but not the first Venturi injector 202. In this scenario, the second Venturi injector 203 would be positioned, as illustrated, proximate to the first flocculant injection point 214. The third Venturi injector 204, would be positioned as illustrated, after the post-hydrocyclone vortex has dissipated. The third Venturi injector 204 would be larger than the second Venturi injector.

The wastewater treatment system 200 may include gauges to measure various parameters. The wastewater treatment system 200 may also include a controller to control the speed of pumps, control dosing of coagulant and flocculant, control actuators, and optimize system throughput. The gauges may include flow meters to monitor air injection rates into the Venturi injectors and fluid flow rate along the wastewater conduit, mass flow meters to measure solids concentration in the wastewater, and pressure gauges to monitor the system pressure at various stages along the wastewater conduit 205. The general principle, discussed for FIG. 19, to create suction during the startup and shutdown sequence can be applied to the wastewater treatment system 200 of FIG. 15. Continuing to refer to FIG. 15, a flow transmitter may be positioned in the coagulant-mixed wastewater stream 205a, before the first Venturi injector assembly 206. In addition, valve 219 could be an actuator-control valve, such as an actuator-controlled multi-turn throttle valve. In addition, a flow transmitter could be connected in series with the suction port of the first Venturi injector 202. During the startup and shutdown sequence, the controller could continuously adjust valve 219, based on the flow rate of the flow transmitter positioned in the coagulant-mixed wastewater stream 205a discussed above. The controller could also monitor the suction based on the flow meter connected in series with the suction port of the first Venturi injector 202.

Continuing to refer to FIG. 15, the coagulant injector assembly 239 included pump 232. This pump was described as a metering pump. The coagulant injector assembly 239 may include other pumps, instead of a metering pump, that are suitable for pumping coagulant. The coagulant injection point 211 may brass fitting tapped directly into the piping. The coagulant injection point 211 may be any suitable pipe coupling for injecting coagulant. FIG. 15 also discussed a coagulant reservoir 231. The coagulant reservoir 231 may be a tank or other vessel suitable for holding a coagulant.

Similarly, the pump used for injecting flocculant need not be a metering pump. Any pump suitable for pumping a flocculant may be used. The flocculant injection points may be a brass fitting tapped directly into the piping, or any other suitable fitting or pipe coupling. The flocculant reservoir or reservoirs may be a tank or other vessel suitable for holding a flocculant.

This disclosure discusses using Venturi injectors to inject fluids such as $O_2$, $CO_2$, and $O_3$, to create gas bubbles in a fluid stream. The disclosure also discusses using Venturi injectors to inject fluids, such as liquids, into a fluid stream. For example, one or more types of fertilizer may be passively injected into a liquid stream using two or more Venturi injectors positioned in series along a liquid conduit, where each successive Venturi injector of the two or more Venturi injectors in a direction of liquid flow is larger than an immediately preceding Venturi injector. It is also possible to use one or more of these Venturi injectors to inject a liquid, such as fertilizer into a water stream of an irrigation system, and one or more of these Venturi injectors to inject a gas, such as air to produce bubbles in the resulting water and fertilizer mixture. This would allow for both root aeration by the air bubbles and plant fertigation via the fertilizer. The variations described, the general principles taught, and undescribed variations, devices, and systems that encompass the general principles described in this disclosure, are within the claim's scope.

The invention claimed is:

1. A system, comprising:
   two or more Venturi injectors positioned in series along a liquid conduit, where each successive Venturi injector of the two or more Venturi injectors in a direction of liquid flow is larger than an immediately preceding Venturi injector of the two or more Venturi injectors;
   each of the two or more Venturi injectors includes a monolithic body forming a fluid passage that is continuous and axially-aligned, and that converges, without interruption, from a motive-liquid inlet directly to a throat of minimum cross-sectional diameter along the fluid passage, and then diverges, without interruption, directly from the throat into a fluid outlet; and
   each of the two or more Venturi injectors includes a suction inlet port that extends into the throat transverse to the direction of liquid flow along the fluid passage.

2. The system of claim 1, wherein:
   a Venturi injector of the two or more Venturi injectors is positioned in a bypass configuration.

3. The system of claim 1, wherein:
   the two or more Venturi injectors include a first Venturi injector and a second Venturi injector; and the liquid conduit includes piping positioned between and separate from the first Venturi injector and the second Venturi injector.

4. A system, comprising:

a first Venturi injector and a second Venturi injector positioned in series along a liquid conduit with the second Venturi injector positioned downstream from the first Venturi injector;

the second Venturi injector is larger than the first Venturi injector;

each of the first Venturi injector and the second Venturi injector includes a monolithic body forming a fluid passage that is continuous and axially-aligned, and that converges, without interruption, from a motive-liquid inlet directly to a throat of minimum cross-sectional diameter along the fluid passage, and then diverges, without interruption, directly from the throat into a fluid outlet; and each of the first Venturi injector and the second Venturi injector includes a suction inlet port that extends into the throat transverse to a direction of liquid flow along the fluid passage.

5. The system of claim 4, wherein:

the first Venturi injector is positioned in a bypass configuration.

6. The system of claim 5, wherein:

the bypass configuration includes a flow-through portion along the liquid conduit and a bypass portion positioned in parallel with the flow-through portion;

a valve is positioned along the flow-through portion; and the first Venturi injector is positioned in the bypass portion.

7. The system of claim 5, wherein:

the bypass configuration includes a flow-through portion along the liquid conduit and a bypass portion positioned in parallel with the flow-through portion;

the first Venturi injector is positioned along the flow-through portion; and a valve is positioned in the bypass portion.

8. The system of claim 4, further comprising:

a third Venturi injector positioned in series with and downstream from the second Venturi injector; and the third Venturi injector is larger than the second Venturi injector.

9. The system of claim 4, wherein:

the liquid conduit includes piping positioned between and separate from the first Venturi injector and the second Venturi injector.

10. A wastewater treatment system, comprising:

a first Venturi injector and a second Venturi injector positioned in series along a wastewater conduit with the second Venturi injector positioned downstream from the first Venturi injector, the first Venturi injector and the second Venturi injector are structured and positioned relative to the wastewater conduit, to inject air bubbles into a wastewater stream within the wastewater conduit;

the second Venturi injector is larger than the first Venturi injector;

each of the first Venturi injector and the second Venturi injector includes a monolithic body forming a fluid passage that is continuous and axially-aligned, and that converges, without interruption, from a motive-liquid inlet directly to a throat of minimum cross-sectional diameter along the fluid passage, and then diverges, without interruption, directly from the throat into a fluid outlet; and each of the first Venturi injector and the second Venturi injector includes a suction inlet port that extends into the throat transverse to a direction of liquid flow along the fluid passage.

11. The wastewater treatment system of claim 10, further including:

a coagulant reservoir that includes a coagulant;

a coagulant injector assembly connected to the coagulant reservoir and positioned to inject the coagulant into the wastewater conduit at a coagulant injection point;

coagulant mixing tubes located downstream from the coagulant injection point and positioned along the wastewater conduit to mix the coagulant into the wastewater stream; and the first Venturi injector is located downstream from the coagulant mixing tubes such that the air bubbles injected into the wastewater stream from the first Venturi injector will mix with the coagulant.

12. The wastewater treatment system of claim 11, further including:

a hydrocyclone separator positioned downstream along the wastewater conduit from the first Venturi injector, the hydrocyclone separator includes a hydrocyclone inlet, a first hydrocyclone outlet positioned to remove settleable solids and a second hydrocyclone outlet positioned for receiving a vortex formed within the hydrocyclone separator;

a flocculant reservoir that includes flocculant;

a flocculant injector assembly connected to the flocculant reservoir and positioned to inject the flocculant from the flocculant reservoir into a first wastewater-conduit portion containing the vortex; and the second Venturi injector is located downstream along the wastewater conduit from the first wastewater-conduit portion into a second wastewater-conduit portion not containing the vortex.

13. The wastewater treatment system of claim 11, further including:

a flocculant reservoir that includes flocculant;

a first flocculant injector assembly connected to the flocculant reservoir and positioned to inject the flocculant from the flocculant reservoir into a first flocculant injection point in the wastewater conduit downstream from the first Venturi injector;

the second Venturi injector is positioned upstream from the first flocculant injection point such that the air bubbles resulting from air injected into the wastewater stream from the second Venturi injector will mix with the flocculant injected by the first flocculant injector assembly;

a hydrocyclone separator positioned downstream along the wastewater conduit from the second Venturi injector, the hydrocyclone separator includes a hydrocyclone inlet, a first hydrocyclone outlet positioned to remove settleable solids and a second hydrocyclone outlet positioned for receiving a vortex formed within the hydrocyclone separator;

a second flocculant injector assembly connected to the flocculant reservoir and positioned to inject the flocculant from the flocculant reservoir into a first wastewater-conduit portion containing the vortex; and a third Venturi injector, the third Venturi injector is larger than the second Venturi injector, the third Venturi injector is located downstream along the wastewater conduit from the first wastewater-conduit portion into a second wastewater-conduit portion not containing the vortex.

14. The wastewater treatment system of claim 13, further including:

a booster pump positioned between the first Venturi injector and the second Venturi injector.

15. The wastewater treatment system of claim 14, wherein:

the flocculant reservoir is a first flocculant reservoir and a second flocculant reservoir, the first flocculant injector assembly is connected to the first flocculant reservoir, and the second flocculant injector assembly is connected to the second flocculant reservoir.

16. The wastewater treatment system of claim 14, further including:

a flotation tank structured to separate product water from thickened sludge, the flotation tank is positioned downstream from the third Venturi injector.

17. The wastewater treatment system of claim 10, further including:

a hydrocyclone separator positioned downstream along the wastewater conduit from the first Venturi injector, the hydrocyclone separator includes a hydrocyclone inlet, a first hydrocyclone outlet positioned to remove settleable solids and a second hydrocyclone outlet positioned for receiving a vortex formed within the hydrocyclone separator;

a flocculant reservoir and a pump structurally connected to the flocculant reservoir and positioned to inject flocculant into a first wastewater-conduit portion containing the vortex; and the second Venturi injector is located downstream along the wastewater conduit from the first wastewater-conduit portion into a second wastewater-conduit portion not containing the vortex.

18. The wastewater treatment system of claim 10, wherein:

the wastewater conduit includes piping positioned between and separate from the first Venturi injector and the second Venturi injector.

* * * * *